United States Patent
Lázaro-Gredilla et al.

(10) Patent No.: US 11,633,860 B2
(45) Date of Patent: Apr. 25, 2023

(54) METHOD AND SYSTEM FOR MACHINE CONCEPT UNDERSTANDING

(71) Applicant: Intrinsic Innovation LLC, Mountain View, CA (US)

(72) Inventors: Miguel Lázaro-Gredilla, Mountain View, CA (US); Dianhuan Lin, Mountain View, CA (US); J. Swaroop Guntupalli, Mountain View, CA (US); Dileep George, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 16/562,261

(22) Filed: Sep. 5, 2019

(65) Prior Publication Data
US 2020/0070352 A1 Mar. 5, 2020

Related U.S. Application Data

(60) Provisional application No. 62/727,162, filed on Sep. 5, 2018.

(51) Int. Cl.
| | |
|---|---|
| *B25J 9/16* | (2006.01) |
| *G06N 5/04* | (2006.01) |
| *G06N 20/00* | (2019.01) |
| *G06K 9/62* | (2022.01) |
| *G06T 7/73* | (2017.01) |
| *G06F 17/18* | (2006.01) |

(Continued)

(52) U.S. Cl.
CPC ............ *B25J 9/1697* (2013.01); *B25J 9/163* (2013.01); *B25J 9/1671* (2013.01); *G06F 17/18* (2013.01); *G06K 9/6256* (2013.01); *G06K 9/6297* (2013.01); *G06N 5/04* (2013.01); *G06N 20/00* (2019.01); *G06T 7/75* (2017.01); *G06V 10/462* (2022.01); *G06V 30/194* (2022.01)

(58) Field of Classification Search
None
See application file for complete search history.

(56) References Cited

U.S. PATENT DOCUMENTS

| | | | |
|---|---|---|---|
| 5,065,040 | A | 11/1991 | Peterson et al. |
| 5,253,329 | A | 10/1993 | Villarreal et al. |

(Continued)

FOREIGN PATENT DOCUMENTS

JP 2015071206 4/2015

OTHER PUBLICATIONS

Anderson, P. et al., "Bottom-up and top-down attention for image captioning and visual question answering," downloaded from <arxiv.org/abs/1707.07998> (Mar. 14, 2018) 15 pp. (Year: 2018).*

(Continued)

*Primary Examiner* — Brian M Smith
(74) *Attorney, Agent, or Firm* — Fish & Richardson P.C.

(57) ABSTRACT

A system and method for machine understanding, using program induction, includes a visual cognitive computer including a set of components designed to execute predetermined primitive functions. The method includes determining programs using a program induction engine that interfaces with the visual cognitive computer to discover programs using the predetermined primitive functions and/or executes the discovered programs based on an input.

22 Claims, 12 Drawing Sheets

Make central object touch the other object 1 scene_parse( )
2 top_down_attend( )
3 move_hand_to_attended_object( )
4 grab_object( )
5 next_object( )
6 top_down_attend( )
7 move_hand_to_attended_object( )
8 release_object( )

(51) Int. Cl.
G06V 10/46 (2022.01)
G06V 30/194 (2022.01)

(56) References Cited

U.S. PATENT DOCUMENTS

| | | | |
|---|---|---|---|
| 5,666,518 | A | 9/1997 | Jumper |
| 7,580,907 | B1 | 8/2009 | Rhodes |
| 7,711,663 | B2 | 5/2010 | Weng |
| 7,739,208 | B2 | 6/2010 | George et al. |
| 8,103,603 | B2 | 1/2012 | George et al. |
| 8,165,407 | B1 | 4/2012 | Khosla et al. |
| 8,200,025 | B2 | 6/2012 | Woodbeck |
| 8,290,886 | B2 | 10/2012 | George et al. |
| 8,332,339 | B2 | 12/2012 | Nugent |
| 8,340,435 | B2 | 12/2012 | Duong et al. |
| 8,369,652 | B1 | 2/2013 | Khosla et al. |
| 8,442,321 | B1 | 5/2013 | Chang et al. |
| 8,798,375 | B1 | 8/2014 | Chang et al. |
| 9,262,698 | B1 | 2/2016 | George et al. |
| 10,176,424 | B2 * | 1/2019 | Danihelka ............ G06N 3/0445 |
| 2005/0114280 | A1 | 5/2005 | Rising |
| 2005/0265629 | A1 | 12/2005 | Fu et al. |
| 2007/0192270 | A1 | 8/2007 | Hawkins et al. |
| 2008/0154815 | A1 | 6/2008 | Martinez |
| 2009/0006289 | A1 | 1/2009 | Jaros et al. |
| 2009/0299929 | A1 | 12/2009 | Kozma et al. |
| 2011/0064327 | A1 | 3/2011 | Dagher et al. |
| 2012/0005134 | A1 | 1/2012 | Jaros et al. |
| 2012/0109857 | A1 | 5/2012 | George et al. |
| 2013/0243259 | A1 | 9/2013 | Fujita et al. |
| 2013/0259307 | A1 | 10/2013 | Torii et al. |
| 2016/0267375 | A1 | 9/2016 | George et al. |
| 2017/0024877 | A1 | 1/2017 | Versace et al. |
| 2017/0046576 | A1 | 2/2017 | Eaton et al. |
| 2019/0291277 | A1 * | 9/2019 | Oleynik .................. B25J 9/163 |
| 2020/0026247 | A1 * | 1/2020 | Ohsawa ............. G05B 13/0265 |

OTHER PUBLICATIONS

Fujimoto, S. et al., "Addressing function approximation error in actor-critic models," downloaded from <arxiv.org/abs/1802.09477v2> (Jun. 7, 2018) 14 pp. (Year: 2018).*
Nair, A. et al., "Visual reinforcement learning with imagined goals," downloaded from <arxiv.org/abs/1807.04742v1> (Jul. 12, 2018) 15 pp. (Year: 2018).*
Pinto, L. et al., "Supersizing sefl-supervision: learning to grasp from 50k tries and 700 robot hours," 2016 IEEE Intl. Conf. on Robotics and Automation (ICRA) (May 2016) pp. 3406-3413. (Year: 2016).*
"International Search Report and Written Opinion of the ISA dated Nov. 27, 2019 for PCT/US19/49804."
"Behnke "Hierarchical neural networks for image interpretation." In: Springer Science & Business Media. Jun. 13, 2003 (Jun. 13, 2003) Retrieved from . p. 6-8, 135, 142, 145."
"Bergthold et al., A Study of Parts-Based Object Class Detection Using Complete Graphs, 2009", Jun. 29, 2017 00:00:00.0.
"Fidler et al., Similarity-based cross-layered hierarchical representation for object categorization, 2008", Jun. 29, 2017 00:00:00.0.
"Pedersoli et al, A Coarse-to-fine approach for fast deformable object detection, 2011".
"Sun et al, Articulated Part-based Model for Joint Object Detection and Pose Estimation, 2011".
"Yang et al, Articulated Pose Estimation with Flexible Mixtures-of-parts, 2011".
Akgun, Baris , et al., "Keyframe-based Learning from Demonstration", International Journal of Social Robotics, 4, pp. 342-355,Nov. 11, 2012.
Amalric, Marie , et al., "The language of geometry: Fast Comprehension of geometrical primitives and rules in human adults and preschoolers", PLOS Computational Biology 13, e1005273 (2017).
Andersen, Richard A., et al., "Sensorimotor Integration in Posterior Parietal Cortex", Advances in neurology vol. 93, pp. 159-177 (2003).

Ballard, Dana H., "Animate Vision", Artificial intelligence 48, 5786 (1991).
Ballard, Dana H., et al., "Deictic codes for the embodiment of cognition", Behavioral and Brain Sciences (1997) 20, 723-767.
Balog, Matej , et al., "Deepcoder: Learning to Write Programs", submitted Nov. 7, 2016, arxiv.org, arXiv:1611.01989v2 [cs.LG] Mar. 8, 2017, published as a conference paper at ICLR 2017.
Barsalou, Lawrence W., "Perceptual symbol systems", Behavioral and Brain Sciences (1999) 22, 577-660.
Cangelosi, Angelo , et al., "Symbol Grounding and the Symbolic Theft Hypothesis", Simulating the Evolution of Language, London: Springer, In Cangelosi A & Parisi D (Eds) (2002).
Chen, Xinyun , et al., "Towards Synthesizing Complex Programs From Input-Output Examples", submitted Jun. 5, 2017 arXiv preprint arXiv:1706.01284, arXiv:1706.01284v4 [cs.LG] Mar. 8, 2018, published as a conference paper at ICLR2018.
Dechter, Eyal , et al., "Bootstrap Learning via Modular Concept Discovery", 23rd International Joint Conference Artificial Intelligence Aug. 2013, pp. 1302-1309.
Finn, Chelsea, et al., "One-Shot Visual Imitation Learning via Meta-Learning", arXiv:1709.04905v1 [cs.LG] Sep. 14, 2017.
French, Robert M., et al., "Tabletop: An Emergent, Stochastic Model of Analogy-Making", Proceedings of the 13th Annual Conference of the Cognitive Science Society (1991), pp. 175-182.
Ganin, Yaroslav , et al., "Synthesizing Programs for Images using Reinforced Adversarial Learning", arXiv:1804.01118v1 [cs.CV] Apr. 3, 2018.
George, Dileep , et al., "A generative vision model that trains with high data efficiency and breaks text-based CAPTCHAs", Science vol. 358, Issue 6368, Dec. 2017.
George, Dileep , et al., "A thought is a program . . . ", https://www.vicarious.com/2019/01/18/a-thought-is-a-prgram/, Vicarious, Jan. 18, 2019.
Goodman, Noah D., et al., "Concepts in a Probabilistic Language of Thought", Center for Brains, Minds and Machines, CBMM Memo No. 010, Jun. 14, 2014.
Gulwani, Sumit, "Dimensions in Program Synthesis", Proceedings of the 12th international ACM SIGPLAN symposium on Principles and practice of declarative programming—PPDP '10 (2010), pp. 13-24.
Gullwani, Sumit, et al., "Inductive Programming Meets the Real World", ACM, Nov. 2015, vol. 58, No. 11, pp. 90-99.
Harnad, Stevan , "The Symbol Grounding Problem", 1990, Physica D 42: 335-346.
Hay, Nicholas , et al., "Behavior is Everything—Towards Representing Concepts with Sensorimotor Contingencies", Vicarious AI, AAAI Conference, pp. 1861-1870, Feb. 7, 2018.
Higgins, Irina , et al., "SCAN: Learning Hierarchical Compositional Visual Concepts", arXiv:1707.03389v3 [stat.ML] Jun. 6, 2018.
Hofstadter, Douglas R., et al., "The Copycat Project: A Model of Mental Fluidity and Analogy-Making", Advances in connectionist and neural computation theory 2, 205 (1995).
Huang, De-An , et al., "Neural Task Graphs: Generalizing to Unseen Tasks from Single Video Demonstration", Computer Science Department, Stanford University, arXiv:1807.03480v2 [cs.CV] Mar. 6, 2019 (preprint 2018).
Johnson, Justin , et al., "Inferring and Executing Programs for Visual Reasoning", ICCV (2017), pp. 3008-3017.
Kingma, Diederik P., et al., "Auto-Encoding Variational Bayes", arXiv preprint arXiv:1312.6114 (2013).
Kolodny, Oren , et al., "The Evolution of the capacity for language: the ecological contact and adaptive value of a process of cognitive hijacking", Philosophical Transactions of the Royal Society B: Biological Sciences 373 Feb. 12, 2018.
Lake, Brenden M., et al., "Building Machines That Learn and Think Like People", Behavioral and Brain Sciences, arXiv:1604.002893 [cs AI] Nov. 2, 2016.
Lake, Brenden M., et al., "Human-level concept learning through probabilistic program induction", Sciencemag.org, Dec. 11, 2015, vol. 350, Issue 6266. pp. 1332-1338.
Lakoff, George , et al., "Metaphors we live by", Language vol. 59, No. 1, pp. 201 207 (1983).

(56) References Cited

OTHER PUBLICATIONS

Lazaro-Gredilla, Miguel, et al., "Beyond imitation: Zero-shot task transfer on robots by learning concepts as cognitive programs", Science Robotics, 4 eaav3150 (2019) Jan. 16, 2019.

MacBeth, Jamie C., et al., "Image Schemas and Conceptual Dependency Primitives: A Comparison", CEUR-WS.org/Vol-2050/ISD_paper_2, published in JOWO 2017.

Mandler, Jean M., "Howto Build a Baby: II Conceptual Primitives", Psychological Review vol. 99, No. 4, 587-604 (1992).

Marcus, Gary, et al., "Deep Learning: A Critical Appraisal", arXiv:1801.00631v1 Jan. 2, 2018.

Marcus, Gary, et al., "The atoms of neural computation", sciencemag.org, vol. 346, Issue 6209, pp. 551-552, Oct. 31, 2014.

Overlan, Mattew C., et al., "Learning abstract visual concepts via probabilistic induction in a Language of Thought", Cognition 168, 320-334 (2017).

Piantadosi, Steven T., et al., "Four Problems Solved by the Probablistic Language of Thought", app Association for Psychological Science, (2016) vol. 25(1) 54-59.

Roelfsema, Pieter., R., et al., "Early Visual Cortex as a Multiscale Cognitive Blackboard", Annual Review of Vision Science 2016. 2:131-51.

Roelfsema, Pieter., et al., "Elemental operations in vision", Trends in Cognitive Sciences, vol. 9, No. 5, pp. 226-233, May 2005.

Tremblay, Jonathan, et al., "Synthetically Trained Neural Networks for Learning Human-Readable Plans from Real-Word Demonstrations", arXiv preprint arXiv:1805.07054v3 [cs.RO] Jul. 10, 2018.

Tsotsos, John K., et al., "Cognitive programs: software for attention's executive", Front. Psychol. 5 Nov. 25, 2014.

Tung, Hsiao-Yu Fish, et al., "Reward Learning from Narrated Demonstrations", arXiv:1804.10692v1 [cs.CV] Apr. 27, 2018.

Whitney, David, et al., "Comparing Robot Grasping Teleoperation across Desktop and Virtual Reality with ROS Reality", International Symposium on Robotics Research (2017), pp. 1-16.

Wu, Yan, et al., "Towards One Shot Learning by Imitation for Humannoid Robots", 2010 IEEE International Conference on Robotics and Automation (ICRA 2010), pp. 2889-2894, Anchorage, Alaska, U.S.A., May 2010.

Yamins, Daniel L K, et al., "Using Goal-driven learning models to understand sensory cortex", Nature neuroscience vol. 19, No. 3, pp. 356-365, Mar. 2016.

Yildirim, Ilker, et al., "Learning multi sensory representations for auditory-visual transfer of sequence category knowledge: a probabilistic language of thought approach", Psychonomic Bulletin & Review, vol. 22, pp. 673-686 (2015).

Zylberberg, Ariel, et al., "The human Turing machine: a neural framework for mental programs", Trends in Cognitive Sciences vol. 15, No. 7, pp. 293-300, Jul. 2011.

Canadian Office Action for Application No. 3,028,921, dated Jan. 2, 2020.

European Search Report dated Jan. 22, 2020 for Application No. 16906435.9.

Khotanzad, Alireza, et al., "Classification of Invariant Image Representations Using a Neural Network", IEEE Transactions on Acoustics, Speech and Signal Processing, vol. 38, No. 6, Jun. 1990.

Ishibushi, Satoshi, et al., "Statistical Localization Exploiting Convolutional Neural Network for an Autonomous Vehicle", IECON2015 Yokohama, Nov. 9-12, 2015.

Riesenhuber, Maximillan, et al., "Hierarchical models of object recognition in cortex", Nature Neuroscience, vol. 2, No. 11, Nov. 1999.

International Preliminary Report on Patentability in International Appln. No. PCT/US19/49804, dated Mar. 9, 2021, 8 pages.

Office Action in Japanese Appln. No. 2021512442, dated Jun. 14, 2022, 4 pages (with English translation).

Search Report in Japanese Appln. No. 2021512442, dated May 9, 2022, 51 pages (with English translation).

* cited by examiner

FIGURE 6

METHOD AND SYSTEM FOR MACHINE CONCEPT UNDERSTANDING

CROSS-REFERENCE TO RELATED APPLICATIONS

This application claims the benefit of U.S. Provisional Application No. 62/727,162, filed 5 Sep. 2018, which is incorporated in its entirety by this reference.

This application is related to U.S. application Ser. No. 13/895,225 filed 15 May 2013, which is incorporated in its entirety by this reference.

TECHNICAL FIELD

This invention relates generally to the robotics field, and more specifically to new and useful systems and methods for program induction by robots.

BRIEF DESCRIPTION OF THE FIGURES

FIG. 6 depicts examples of the training data.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
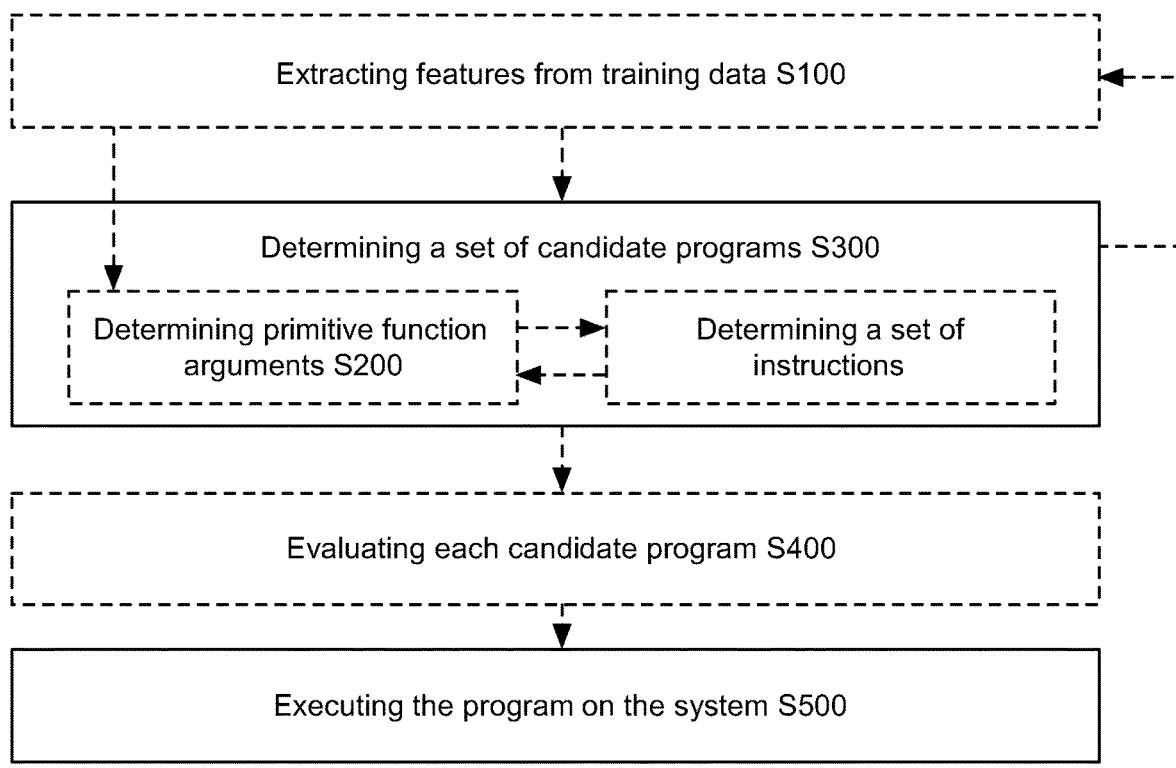
FIG. 1 is a schematic representation of the method.

As shown in FIG. 1, the method includes determining a set of candidate programs S300 and executing programs on the system S500. The method can additionally or alternatively include extracting features from training data S100, determining primitive function arguments S200, and evaluating each candidate program S400, but can additionally or alternatively include any other suitable element. The method functions to generate and execute program on a system, wherein the programs are generated from a set of instructions comprising primitive functions.

In one example, the method includes, for a training data set including one or more initial-target image pairs: determining a Markov chain, formed from chained instructions (primitive functions for each of a set of visual cognitive computer components) with probabilistic inter-instruction transitions and, optionally, probabilistic instruction-argument value transitions; and searching for a candidate program (e.g., series of instructions and optionally argument values) in decreasing order of probability. In a specific example, a generative model for the program space can determine the inter-instruction transition probabilities, and a discriminative model can determine the instruction-argument value transition probabilities. The candidate programs can then be evaluated S400 and selected for use in S500.

Figure 2A:
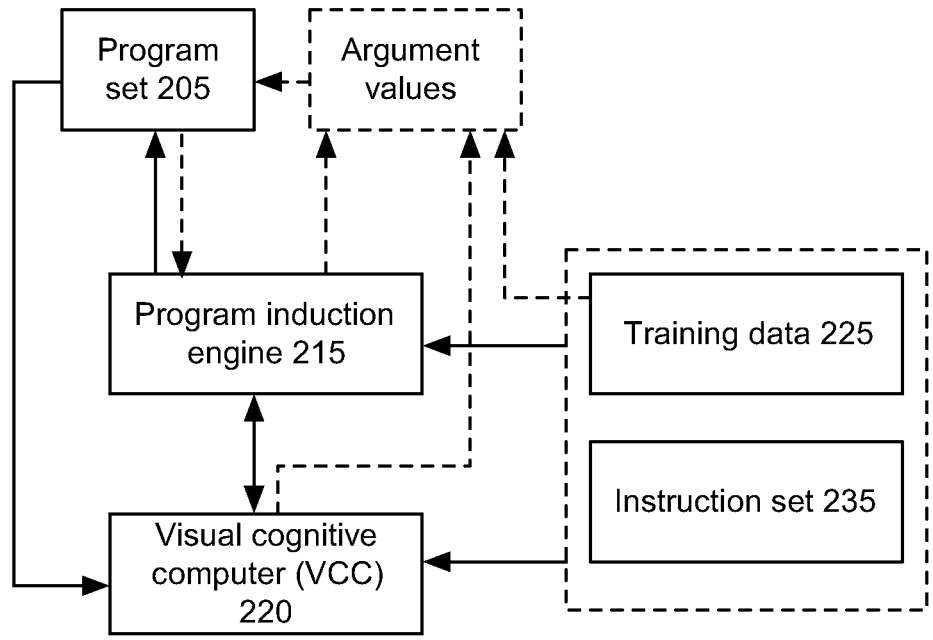
FIGS. 2A and 2B are schematic representations of program induction and execution variants of the system, respectively.
Figure 2B:
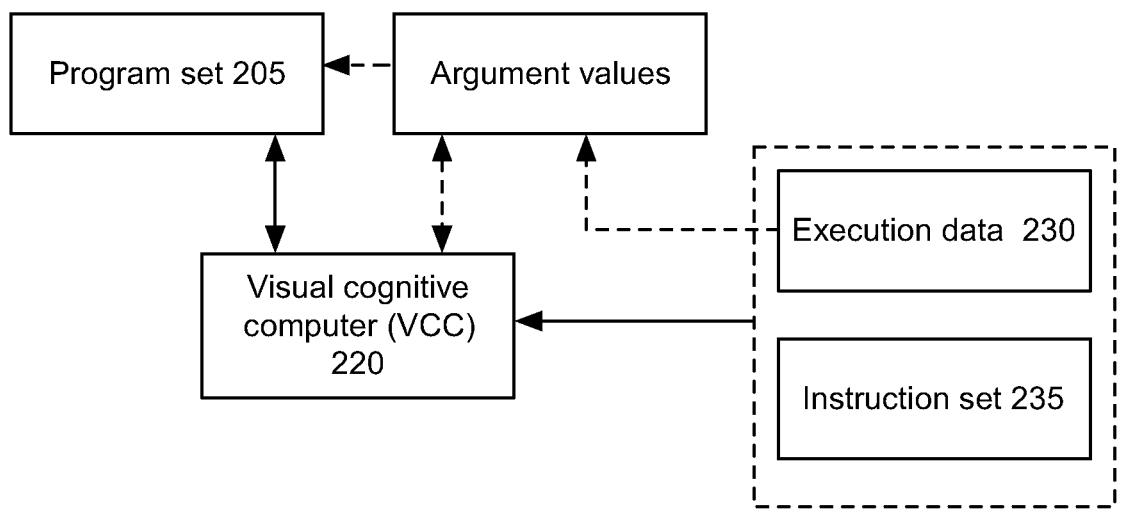

As shown in FIGS. 2A and 2B, the system 20 preferably includes: an instruction set, a visual cognitive computer (VCC), but can additionally or alternatively include a program induction engine, training data, and/or any other suitable component.

In examples, the system and/or method can leverage elements of and/or be similar to that described in Lázaro-Gredilla et al., Beyond imitation: Zero-shot task transfer on robots by learning concepts as cognitive programs. Sci. Robot. 4, eaav3150 (2019) 16 Jan. 2019; and/or Lázaro-Gredilla et al., Supplementary Material: Beyond imitation: Zero-shot task transfer on robots by learning concepts as cognitive programs. Sci. Robot. 4, eaav3150 (2019) 16 Jan. 2019, both of which are incorporated herein in their entireties by this reference. However, the system and/or method can be otherwise configured.

The method is preferably configured to be executed by the system, but can additionally or alternatively be otherwise executed.

2. Benefits.

First, in contrast to conventional methods (e.g., imitation learning) where robots mimic a demonstration in the same setting as the demonstration, the applicant has developed a new and useful method, wherein the cognitive programs induced on the system architecture learn the underlying concepts and generalize well to new settings without explicit demonstrations.

Second, in contrast to conventional systems that include generic registers in a von Neumann architecture, the Applicant codesigned the system architecture with working memories, that are local to system components, and include specific primitive functions, for ease in program induction. In variants, each component of the system architecture is associated with a predetermined set of primitives (e.g., functions, instructions), wherein the cognitive programs (induced programs) include a series of primitives (and corresponding arguments) selected from the predetermined instruction set for an input scene-target scene pair. Programs can be iteratively determined by searching for candidate programs in decreasing order of probability, where the probabilities are determined on the basis of generative models trained on already-found programs (e.g., a chain of instruction-to-instruction transitions, each associated with a probability) and discriminative models that are conditioned on current inputs.

Third, in contrast to architectures like auto-encoders that map a visual input to a fixed encoding in a feed-forward manner, the Applicant has discovered that the simulation memory of VCC can enable the details of an object to be represented (e.g., as schematic representations of perceptual elements) and accessed from the real world. This can allow the vision hierarchy to be part of an interactive querying of the world as part of a program rather than representing a scene in one feed-forward pass for downstream tasks.

Fourth, training data and execution data can have different distributions, but still have the same performance. For example, the training data can include abstract images, while the execution data can be real-world manufacturing images (e.g., images of a container on a conveyor belt).

However, the system and method can confer any other suitable set of benefits.

3. System.

The system 20 preferably includes: one or more instruction sets 235, one or more visual cognitive computers (VCCs) 220. The system 20 can additionally or alternatively include or use: training data 225, execution data 230, one or more program sets 205, one or more program induction engines 215, and/or include any other suitable component. The system functions to interpret a scene and execute a program, and can optionally induce a cognitive program for subsequent execution.

The system 20 preferably uses training data 225, particularly during program induction (e.g., program generation). The training data preferably defines an input and a target for determining a program. The training data preferably includes one or more initial-target image pairs, but can additionally or alternatively include any other suitable set of data. The image pairs within a given training data set are preferably related conceptually, but can additionally or alternatively share object attributes, backgrounds, and/or be otherwise related. An initial-target image pair preferably includes an initial image (initial scene) and a target image (target scene), but can additionally or alternatively be: a video, wherein a first frame is an input frame and a last frame is the target frame; three or more image frames; audio (e.g., instructions); movement data (e.g., virtual movement); written descriptions (e.g., of the key frames, of instructions, etc.); and/or any other suitable data. In one example, the training data can include only key frames (e.g., only the initial scene and the target scene, without intervening scenes; only frames defining the start or end of a manipulation step; etc.). In a second example, the training data can include key frames and intervening frames. However, the training data can include any suitable set of data.

The training data can include one or more images, but can additionally or alternatively include any other suitable data. The images preferably include one or more pairs of an initial image (e.g., start scene) and target image (e.g., end scene), but can additionally or alternatively include key frames, intermediate frames between key frames, or any other suitable frame. The training data is preferably 2D, but can additionally or alternatively be 3D or have any suitable set of dimensions.

The training data can represent objects in the initial image that are to be manipulated (e.g., moved, transformed, etc.) to match (or substantially match, within a predetermined degree of error) the objects within the target image, and/or include any other suitable information. The objects are preferably manipulated by the agent controlled by the VCC, but can additionally or alternatively be manipulated by an external agent, or by any other suitable entity and/or robot.

In variants, the training data can be: real-world images; be a series of images/frames depicting actions to transform the first image into the final image of the series; be a series of abstract representations (e.g., shapes); and/or include any other suitable representation. The training data can be: captured by a visual sensor (e.g., of the VCC); manually generated; simulated (e.g., from a set of example frames, from a set of instructions, etc.); determined from a series of movements executed by an external agent and mapped to the VCC agent; and/or otherwise determined.

The training data preferably includes one or more (virtual) objects. An object preferably has a shape, color, size, pose, but can additionally or alternatively have a shadow, texture, and/or any other suitable attribute (e.g., appearance attribute, position attribute, etc.) or feature. The object is preferably a virtual representation of a physical object in physical space (e.g., a physical working volume), but can additionally or alternatively have any other suitable representation.

The initial image preferably includes one or more objects. The target image preferably includes a set of the one or more objects from the input scene. The set of objects shared by the initial image and the target image can remain the same between the initial image and target image, be modified (e.g., change shape, change color, change size, or additionally or alternatively otherwise change appearance), or be otherwise related. The initial image and target image can optionally include different objects, less objects, more objects, and/or any other suitable set of objects. The target image can be modified from the input scene (e.g., the scene background can be different colors, textures, gradients, etc.; clutter such as additional objects can be added to the background or removed from the background; the lighting conditions can be modified, or any other suitable modification between the input scene and the target scene). The objects in the target scene are preferably in a different arrangement than the arrangement presented in the input scene (e.g., different locations within the input scene, different poses, etc.), but can additionally or alternatively be in the same arrangement or any other suitable arrangement.

Figure 6:
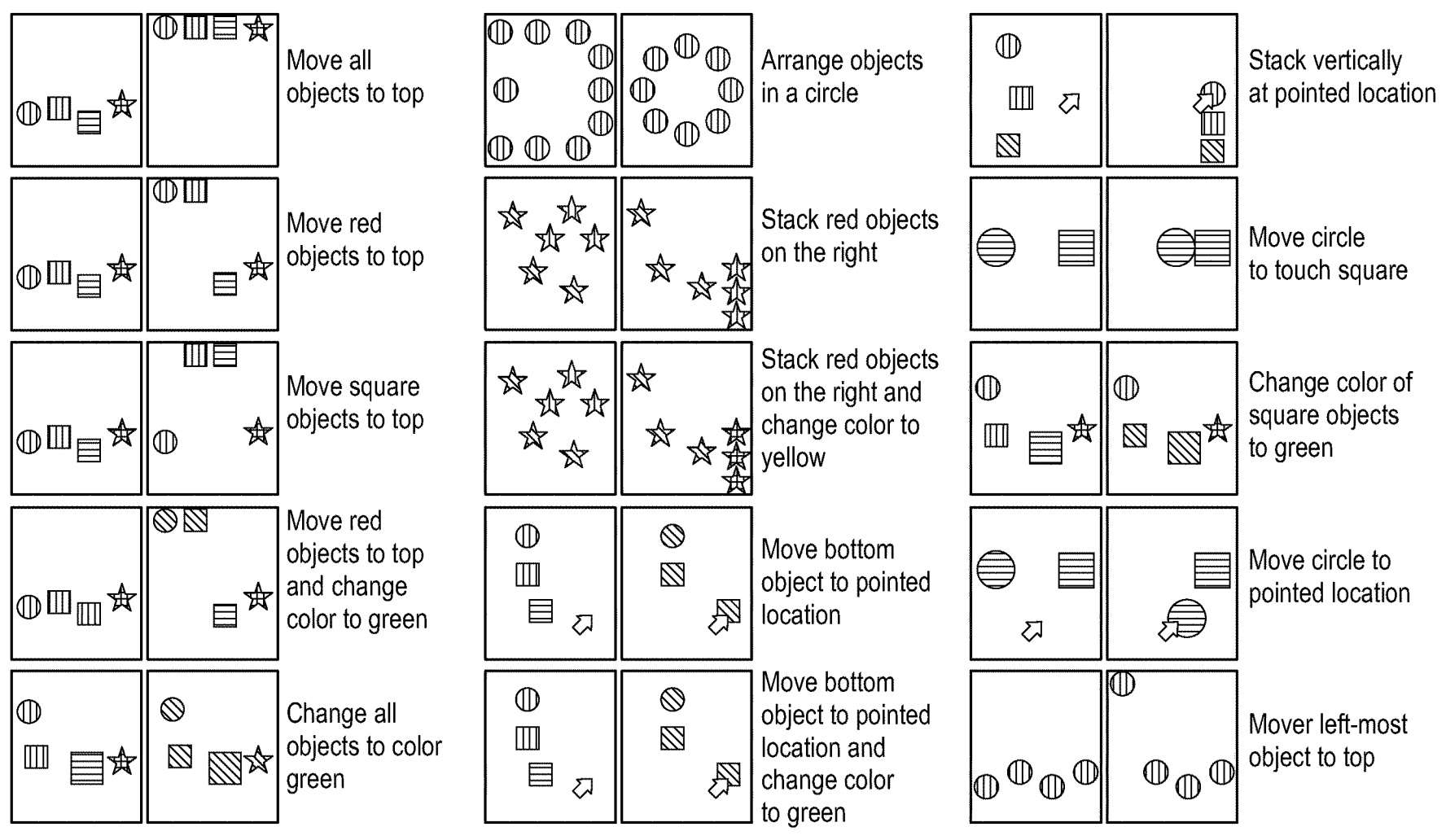

Examples of the training data are depicted in FIG. 6 (e.g., images, written descriptions). The examples in FIG. 6 can be for different programs (e.g., different semantic representations, different program identifiers), the same program (e.g., the same semantic representations, same program identifiers), and/or be otherwise related.

However, the training data can be otherwise determined.

The system 20 can additionally or alternatively use execution data 230, particularly during program execution. The execution data preferably includes at least one input scene, but can additionally or alternatively include one or more: intermediate scenes (e.g., of the current workspace state, of the current object states, etc.), target scenes, and/or any other suitable set of scenes. The execution data can be captured by a visual sensor of the VCC, by an external system, simulated, received from a user, or otherwise determined. The execution data can include: a set of still frames (e.g., scenes); a video wherein a first frame is an input frame; movement data (e.g., for execution state determination, for future state estimation; etc.; wherein movement data can include: virtual movement, manipulator movement, manipulator positioning, etc.), or any other suitable data. The input scene can be 2D, 3D, but can additionally or alternatively have any other suitable dimension. However, the execution data can be otherwise determined. The training data and the execution data preferably have different distributions (e.g., different objects, different initial object attributes, etc.), but can additionally or alternatively have the same distribution. For example, the target image/target scene can represent a concept such as stacking yellow objects, but the objects in the different target image/target scenes could be of different shapes (e.g. cylinders, squares, etc.) The execution data can be similar to the training data, but can additionally or alternatively have different measurement dimensions (e.g., a 3D image, a 3D model, a point cloud, etc.), include more frames (e.g., intermediate frames), and/or be otherwise different from the training data.

The system 20 can additionally or alternatively include one or more computer readable media that stores the working memories, stores the program set(s), and executes the system modules. The computer readable media can be a database, but can additionally or alternatively include RAMs and/or ROMs, flash memory, EEPROMs, optical devices (CD or DVD), hard drives, floppy drives, and/or any suitable storage device. The computer readable media can be non-volatile, volatile, and/or include any other suitable characteristic.

The system 20 preferably includes one or more instruction sets 235. The instruction set preferably includes one or more sets of primitive functions. Each primitive function set is preferably associated with a single system component of the VCC, but can additionally or alternatively be associated with multiple VCC system components. The primitive functions are preferably functions executable by the respective system component (e.g., each associated with a set of machine code or bytecode), but can additionally or alternatively specify queries of the respective system component, manipulate the respective system component, or otherwise interact with the respective system component. The primitive functions can be predetermined, manually determined, hard coded, determined based on program search time, but can be additionally or alternatively otherwise determined. The instruction set is preferably stored in computer readable media, but can be additionally or alternatively otherwise stored.

A primitive function can additionally or alternatively be associated with a set of argument values 236 (e.g., variable values). The set of arguments and/or argument values associated with a primitive function can be: predetermined, manually determined, determined by the visual hierarchy (vision hierarchy; e.g., wherein the visual hierarchy's output attribute values, such as from a given hierarchical level, are available as argument values for a predetermined primitive function), and/or otherwise determined.

The argument values can function to determine the effect of the primitive function. The argument can take on one or more values. Argument values can be shared between or specific to a program induction iteration and/or execution session. The specific arguments to be used in a given program set can be determined: probabilistically (e.g., neural network, regression, decision tree, etc.), by external or manual guidance (e.g., a pointer specifies the fixation location for a fixation controller argument, example shown in FIG. 7), or be otherwise determined. The specific argument values to be used in a given program set can be determined by the VCC based on: the input scene (e.g., of the training data, of the execution data), intermediate scenes (e.g., during execution, during object manipulation), simulation of the current or future object or working area state, external input, and/or otherwise determined.

For example, arguments can include positional arguments for the fixation controller (e.g., center, left, right, bottom, top, etc.). In a second example, arguments can include setting the attention to objects of a specified color (e.g., red, green, blue, yellow, etc.), setting the attention to object of a specified shape (e.g., square, triangle, star, circle, diamond, etc.). In a third example, arguments can include setting the color to fill the currently attended object (e.g., red, green, yellow, etc.). In a fourth example, arguments can include determining an imagined/simulated new object or target, different from the objects in the input scene and target scene (e.g., horizon line, circle, square, triangle, etc.).

However, the instruction set, arguments, and argument values can additionally or alternatively be otherwise determined and/or include any other suitable component.

A program generated by the program induction engine preferably functions to determine operations for the VCC for completing a task, wherein the task is determined from the training data. The task can be a full task (e.g., program-created end state), a partial task (e.g., program-created intermediate state), and/or any other suitable task. The end state, intermediate state and/or by any other suitable state can be determined by the simulation memory, by an external agent, and/or by any other suitable component. The program is preferably a set of instructions (primitive functions), wherein the instructions within the set can be executed in series, in parallel, and/or a combination thereof. The program can additionally or alternatively include argument values, and/or have argument values that are determined during execution (e.g., based on the execution data). However, the program can include any other suitable information. The program is preferably executable on the VCC, but can additionally or alternatively be executable on any other suitable computer architecture. The program is preferably stored in computer readable media and more preferably in non-volatile memory, but can be additionally or alternatively stored in volatile memory, stored remotely (e.g., remote server), and or otherwise stored. The program can be stored with one or more program identifiers, additional information (e.g., probability score, proximity score, program length, program execution time, training data, execution data, and/or any other suitable data), the initial-target pair, an identifier for a set of initial-target pair(s), but can additionally or alternatively be stored with any other suitable data. The program can be: determined by the program induction engine, predetermined (e.g., by an external agent), manually determined, hard coded, but can be additionally or alternatively otherwise determined.

The system can generate one or more programs for: a given task (e.g., set of initial-target pairs); a partial task (e.g., set of the initial-target pairs), multiple tasks (e.g., for multiple sets of initial-target pairs); a single program; and/or any other suitable number of programs, related to the training sets in any suitable manner.

The system 20 preferably includes one or more program induction engines 215. The program induction engine preferably functions to generate one or more programs from training data (e.g., initial-target image pair, etc.), and can optionally: process training data, select a set of instructions from the instruction set, determine argument values for the instructions, and iteratively generate and/or use the program set (e.g., generating a program set the explore phase, using the program set to update the program induction engine during a compress phase). In variants, the program induction engine can select a subset of primitive functions (e.g., for each of the VCC components) that collectively control the VCC to complete the task specified by the input and target scene, and can optionally select the arguments and/or argument values for the selected primitive functions.

The program induction engine preferably includes one or more generative models. The generative model preferably functions to determine a program given the training data. The generative model is preferably a Markov model (e.g., with a memory or order; a stationary Markov chain, etc.), but can additionally or alternatively be tree or graph, a neural network, Bayesian network, probabilistic model, stochastic model, and/or be any other suitable model. The generative model can be: learned, manually determined, or otherwise determined. The system can include a single generative model, a different generative model per candidate program or program induction instance, a different generative model per training data set (e.g., per cognitive program), and/or any other suitable number of generative models.

The generative model preferably includes an order (e.g., order-0, order-1, etc.). In a first example, the generative model is an order-0 model, and learns relative frequencies of instructions. In a second example, the generative model is an order-1 model, and learns transition probabilities of instructions in programs. However, the transition probabilities can additionally or alternatively be otherwise determined.

The generative model preferably includes instruction-to-instruction transitions, wherein each transition is associated with a probability. The probability for each transition can be static, vary as a function of the VCC component states, vary as a function of prior-selected instructions, be learned (e.g., determined based on prior states, determined by a neural network, etc.), or otherwise determined.

The generative model can optionally include sub-routines in lieu of instructions (e.g., instruction-to-sub-routine transitions, sub-routine-to-sub-routine transitions, sub-routine-to-instruction transitions, etc.). A sub-routine is preferably a sequence of instructions (e.g. two or more instructions), but can additionally or alternatively be otherwise determined. The sub-routines can be instruction sequences that repeatedly appear in programs (e.g., selected for execution, candidate programs, etc.), be manually-specified sequences, and/or be otherwise determined.

The generative model can optionally include instruction-to-endpoint and/or sub-routine-endpoint (e.g., program completion, VCC exception, etc.) transitions, and/or include any other suitable transitions.

In one example, the generative model includes a Markov chain of order 1, wherein the primitive functions from the instruction set, arguments, and/or sub-routines form the nodes, and each transition is associated with a probability. During program induction, the program induction engine can traverse through the Markov chain to determine one or more programs that satisfy the task (e.g., chain of primitive functions, determined based on the respective probabilities given the object attributes extracted from the input scene and/or the target scene). The generative model can optionally be updated after candidate program generation based on the candidate programs and/or one or more program metrics (e.g., length; similarity to target scene; etc.).

However, the generative model can additionally or alternatively be otherwise configured and/or determined.

The program induction engine and/or VCC can include one or more feature extractors. The feature extractor preferably functions extract features from the input and/or target images. The feature induction engine can additionally or alternatively function to determine difference features between the input and the target (e.g., the yellow circle in initial image is a green circle in the target image), but can additionally or alternatively perform any other suitable set of functionalities.

The feature extractor can be an algorithm that determines pixel channels for a given image. The feature extractor can additionally or alternatively be a layer (e.g., RCN layer) or output (e.g., hierarchical layer) of the vision hierarchy, determined by comparing comparable hierarchical layers from the hierarchy for the input scene and the hierarchy for the target scene. However, any other suitable feature extractor can be used. The output of the feature extractor can include feature vectors, a feature value, a feature summary, and/or any other suitable feature data.

The feature extractor can extract one or more two-dimensional features. Two-dimensional features can include pixels, patches, descriptors, keypoints, edges, line segments, blobs, pyramid features, contours, joint lines, optical flow fields, gradients (e.g., color gradients), bitplanes, colors, shapes (e.g., wherein the object edges can be classified into one or more shapes), and additionally or alternatively any other suitable feature. Two-dimensional features can be extracted (e.g., using feature-specific extraction methods), read (e.g., from metadata associated with the image), or otherwise determined. Two-dimensional features can be extracted using one or more: feature detectors (e.g., edge detectors, keypoint detectors, line detectors), motion estimation methods (e.g., direct methods, such as block-matching, phase correlation, frequency domain, pixel recursive methods, optical flow, etc.; indirect methods; etc.), neural networks (e.g., convolutional neural networks (CNN), deep neural networks (DNN), recurrent neural networks, generative neural networks, etc.), segmentation (e.g., semantic segmentation, region-based segmentation, edge detection segmentation, cluster-based segmentation, etc.), and/or any other suitable method for extracting features.

The features extracted by the feature extractor can be used by the discriminative model for argument prediction, can be used by the vision hierarchy to separate objects and their respective attributes, but can be otherwise used.

However, the feature extractor can additionally or alternatively include any other suitable components.

The program induction engine preferably includes one or more discriminative models. The discriminative model preferably functions to determine arguments and/or argument values for instructions and/or sub-routines in the generative model. The program induction engine can include one or more program induction engines. The discriminative model can be specific to a given instruction, specific to a system component, generic across all instructions, or be otherwise structured. The discriminative model is preferably a CNN, but can additionally or alternatively be any other suitable type of neural network, regression, clustering algorithm, supervised algorithm, unsupervised algorithm, or any other suitable algorithm. The discriminative model can additionally or alternatively include a random field such as conditional random field, Markov random field, and/or any other suitable random field. The discriminative model can additionally or alternatively include querying the vision hierarchy for object information, querying the object indexing memory for object information and/or any other suitable query. The discriminative model preferably takes input features (e.g., from the input scene, from the vision hierarchy, from the object working memory, from the color working memory, etc.), but can additionally or alternatively process difference features (e.g., from the feature extractor), fixation guidance (e.g., from the fixation controller), features from one or more images, and/or any other suitable feature. The discriminative model can output: candidate argument values for instructions, probabilities for each of a set of predetermined argument values (e.g., used within the exponential search space or tree), or any other suitable output. The output values associated with the discriminative model are preferably conditioned on the current primitive function (e.g., possible arguments associated with the primitive function), but can be unconditioned, and/or otherwise conditioned. For example, if the primitive function is set the color attention then the possible argument values are red, yellow, green, blue, etc. The discriminative model can be conditioned on the argument values associated with the primitive function (e.g., set the color attention) by forcing zero probability for outputs that are not color outputs (as opposed to letting the model assign small probabilities to other argument feature classes such as objects, shapes, values, etc.). In another example, a different argument probability can be associated with each of a plurality of possible arguments for the primitive function, wherein an argument for a primitive function is selected based on the respective argument probability.

However, the discriminative model can be additionally or alternatively otherwise determined and/or include any other suitable components.

Figure 9:
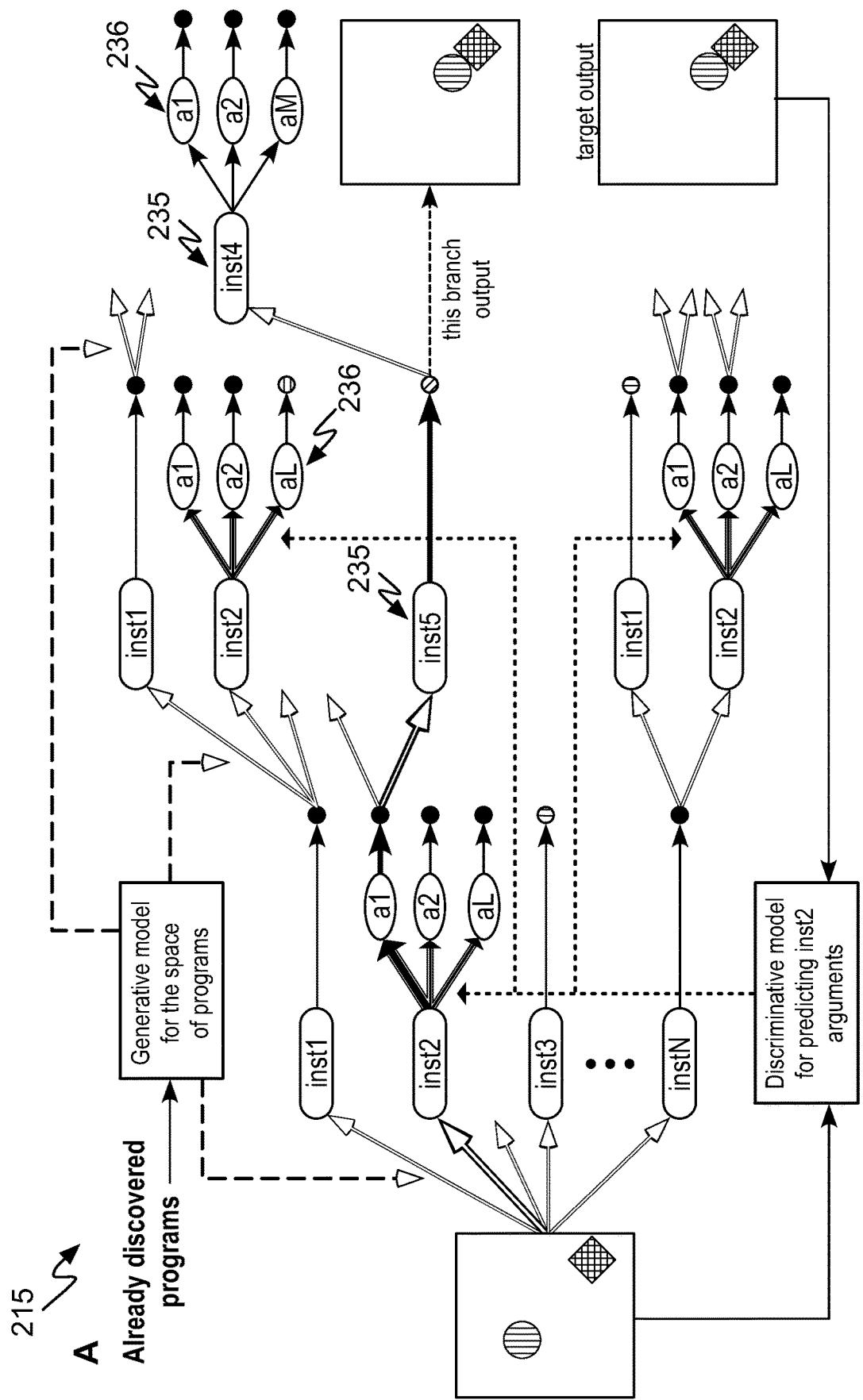
FIG. 9 is an example of the program induction engine.

An example of the program induction engine is depicted in FIG. 9.

Figure 3:
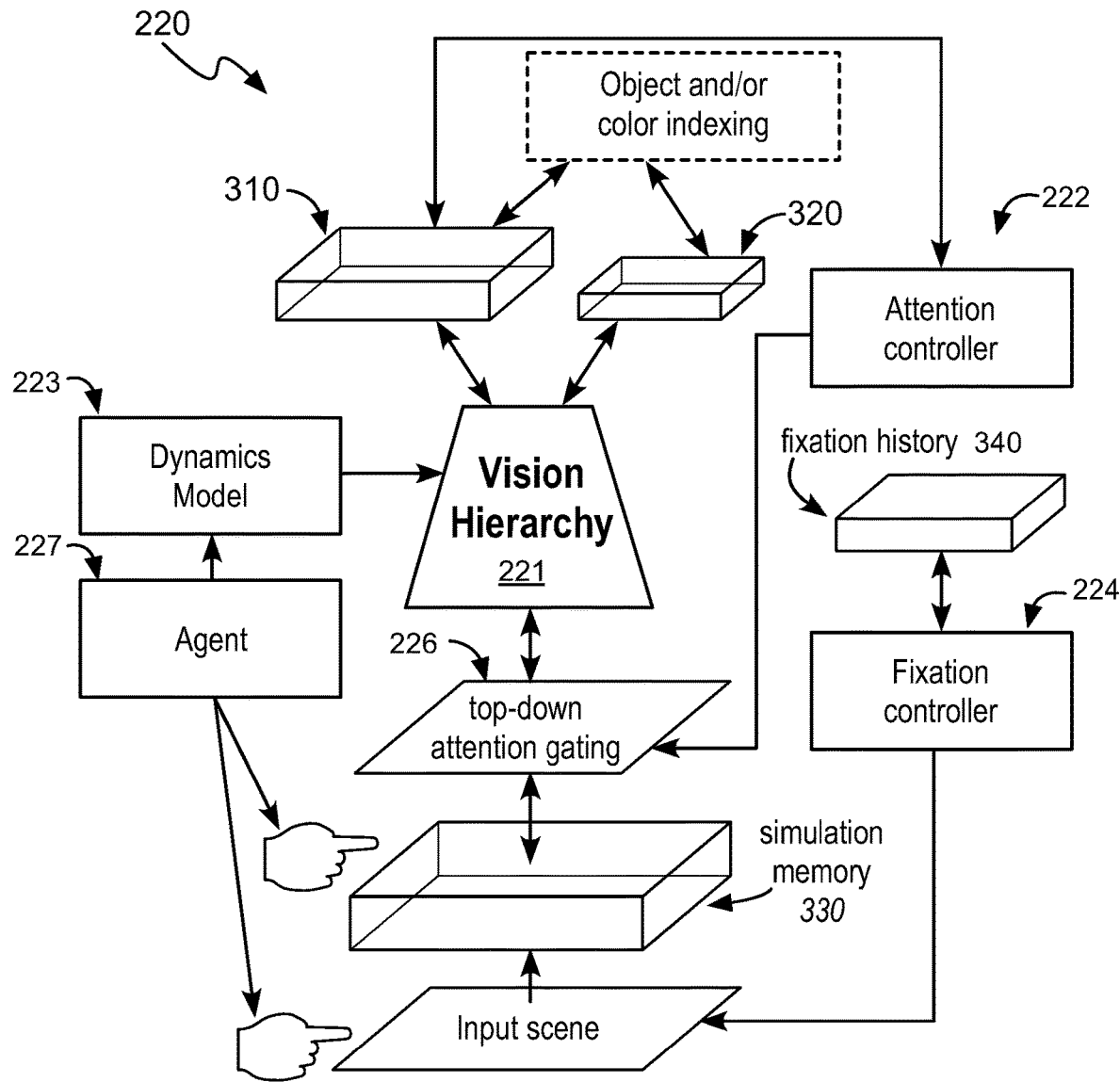
FIG. 3 is a schematic representation of the system.

The system 20 preferably includes one or more visual cognitive computers (VCCs) 220 that function to: process training data (e.g., during program induction), execution data (e.g., during program execution), the instruction set, the program set, and/or any other suitable information. The VCC preferably includes: one or more vision hierarchies 221, one or more working memories (e.g., one or more simulation memories, one or more fixation memories, one or more indexing memories, etc.), one or more dynamics models 223, one or more fixation controllers 224, one or more attention controllers 222, one or more attention gating mechanisms 226, one or more agents 227. An example of the VCC is depicted in FIG. 3. However, the VCC can additionally or alternatively include any other suitable components.

The VCC can be used during program induction to understand concepts from initial-target pairs to determine a program for the initial-target pair and simulate the output of a candidate program. The VCC can additionally or alternatively be used during program execution (e.g., runtime) to execute a predetermined program given an input. The VCC can function to predict the effect of imagined movements and write those results into the simulation memory (e.g., using the dynamics model and the vision hierarchy). However, the VCC can additionally or alternatively perform any other suitable set of functionalities.

Figure 4:
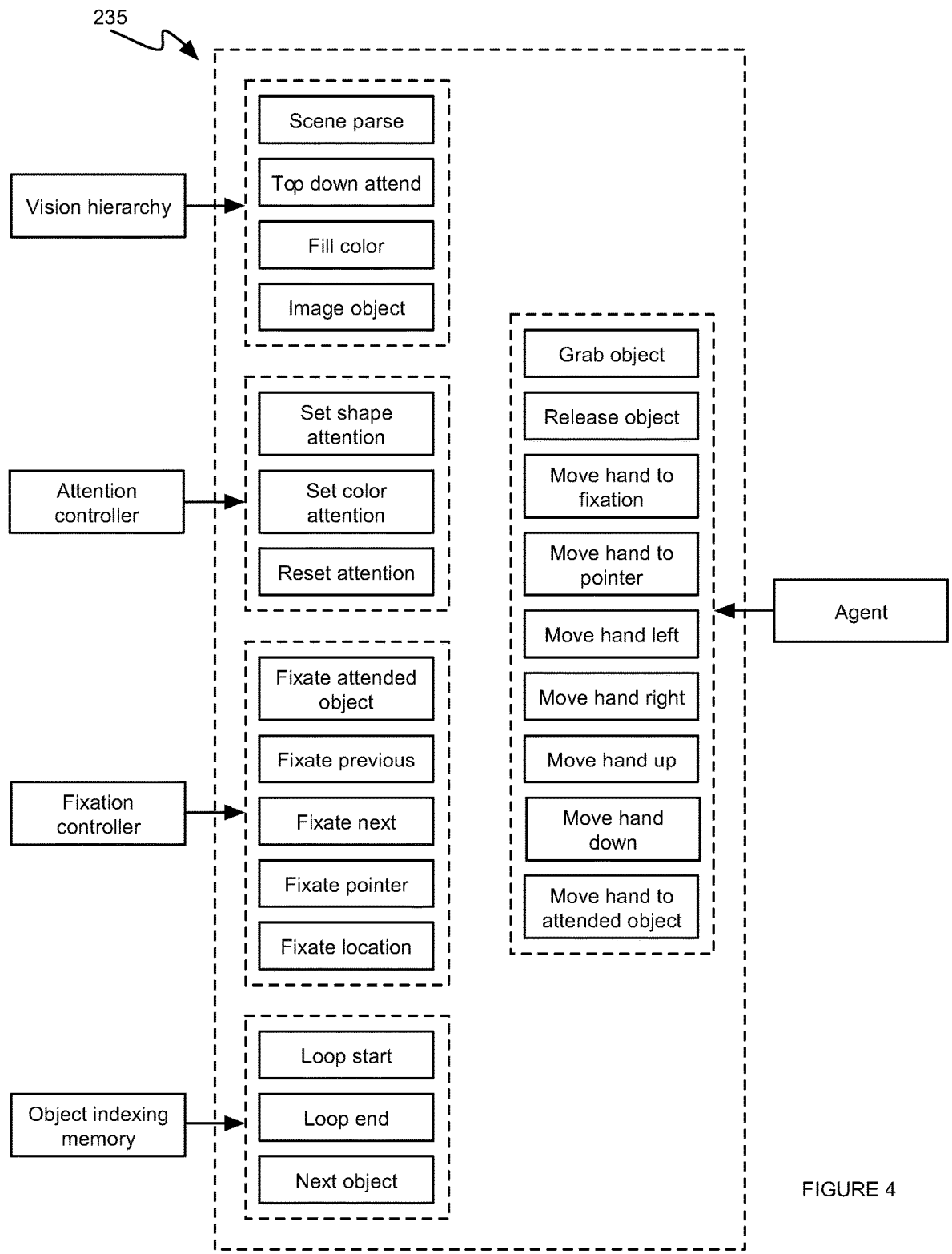
FIG. 4 depicts a variant of the instruction set.

The VCC is preferably a computer architecture including system components associated with specific instruction sets. For example, as shown in FIG. 4, specific VCC components can be associated with specific instruction subsets. The instructions can be run as functions or programs on the respective system component (of the VCC). The VCC can be a sensorimotor system that can run simulations with imageable spatial information. The VCC can interact with tabletop world (TW), but can additionally or alternatively use Raven's progressive matrices (RPMs), datasets that measure pixel-accurate image reconstructions such as to evaluate the VCC's conceptual understanding, and/or include or interface with any other suitable data structure.

In one variant, the VCC can be a computer configured to control any other suitable output or manipulator (e.g., robot, vehicle such as a car, plane, scooter, bicycle; etc.). In a second variation, the VCC can be a computer configured to induce programs for third-party execution, given an initial and a final state. However, the VCC can be otherwise used.

Each VCC component is preferably executed on a dedicated computing system (e.g., individual processing systems, optionally with local memory); however, the VCC components can be executed on a common computing system, and/or otherwise executed.

The VCC preferably includes one or more vision hierarchies 221, which function to parse images or scenes. The vision hierarchy can parse (and/or represent): the initial image (e.g., training image, initial image sampled during execution), the target image, any intermediate images (e.g., captured by a camera associated with the VCC during execution), and/or any other suitable image.

The scene (image) can include one or more objects, a background, and/or any other suitable visual feature. The background can be a surface (e.g., the table), can be cluttered (e.g., include objects that are not of interest, include objects that do not change position between the initial image and the target image, etc.), uncluttered, patterned, unpatterned, and/or have any other suitable set of visual features. The background can be the physical world, can be a simulated/virtual world, but can additionally or alternatively be any other suitable background.

The vision hierarchy is preferably a generative vision model, but can additionally or alternatively be any other suitable neural network (e.g., CNN, RNN, GAN, etc.), machine learning model (e.g., K-nearest neighbors, SVM, etc.), a hierarchy (e.g., a queryable hierarchy of scene features, object(s) features, etc.), a tree, and/or any other suitable data structure.

The vision hierarchy preferably parses and/or represents scenes as constituent object attributes, such as object shape, size, color, position, and/or orientation, but can additionally or alternatively parse scenes into background and foreground, and/or extract any other suitable scene feature. In one example, the vision hierarchy represents the shape of an object factorized from its appearance attributes (e.g., color, texture, etc.).

The vision hierarchy can include or interface with the attention controller, wherein the attention controller selects which object and which attributes to use, from the hierarchy, during program induction and/or program execution. The vision hierarchy preferably interfaces with (e.g., writes object attributes to and/or reads object attributes from) the object working memory and/or color working memory, but can additionally or alternatively interface with the simulation memory (e.g., simulate the object attributes in virtual space) and/or any other suitable working memory.

In a first variation, the vision hierarchy can include a top encoding. The top encoding can include an abstract representation of the world. The top encoding can be lossy (e.g., not include all information of the scene), but can additionally or alternatively be detailed and/or be otherwise determined. The top encoding data can be accessed in real-time, on demand, or at any other suitable time.

In this variation, the vision hierarchy can optionally include a bottom encoding. The bottom encoding can be a detailed representation of the world (e.g., pixel level representation), or be additionally or alternatively otherwise determined.

In this variation, the vision hierarchy can optionally include one or more intermediate encodings. The intermediate encoding can be positioned between the top encoding and the bottom encoding. The intermediate encoding can depict shapes, lines, blobs, edges, and/or any other suitable feature (e.g., of the object).

The vision hierarchy can be generated by training, by processing an initial image, by processing an output image, and/or otherwise generated.

The vision hierarchy can include parameters. The parameters are preferably predetermined (e.g., pre-trained), but can additionally or alternatively be trained, based on heuristics, determined based on the scene, and/or can be otherwise determined. Parameters (and/or feature values, hierarchical level values, entire vision hierarchy, etc.) can be stored in working memory (e.g., object working memory, color working memory, etc.), but can additionally or alternatively be otherwise stored.

The vision hierarchy can have associated instructions from the instruction set (e.g., scene parse, top down attend, fill color, imagine object, etc.).

In one example, scene parse can be the start of a program. Scene parse can function to parse the input scene into objects, and place them into the simulation memory. Scene parse can function to populate the object-indexing memory at the top of the vision hierarchy. Since the default position of the fixation is at the center of the initial image, the objects in the object indexing memory will be ordered according to their distance from the image center. However, scene parse can provide any other suitable set of functionalities.

In a second example, top down attend can function to set the attention to a particular object in the object indexing memory and/or the simulation memory. This can be achieved by marking the object corresponding to the current location of the object indexer within the object indexing memory as attended. It can establish a correspondence between an index at the top of the vision hierarchy and its object mask in the simulation memory.

In a third example, fill color can function to fill the currently attended object with the color specified as the argument. Fill color can modify the representation of the object in the simulation memory, but can additionally or alternatively provide any other suitable set of functionalities.

In a fourth example, imagine/simulate object can function to imagine a new object of the kind specified in the argument. Imagine/similar object can write that object into the simulation memory. The object can be imagined at the current location of fixation, and/or at any other suitable location. The simulation memory can mark the imagined object with a flag so that imagined objects can be distinguished from real objects. The imagined objects can behave like real objects during interactions (e.g., based on simulated physical interactions from the dynamics model). Imagine/simulate can additionally or alternatively provide any other suitable set of functionalities.

The vision hierarchy can be configured to interact with the attention controller, the dynamics model, the simulation memory, but can additionally or alternatively be configured to interact with any other suitable component.

In one example, the vision hierarchy can parse input scenes containing multiple objects and can imagine objects using the simulation memory.

Figure 5A:
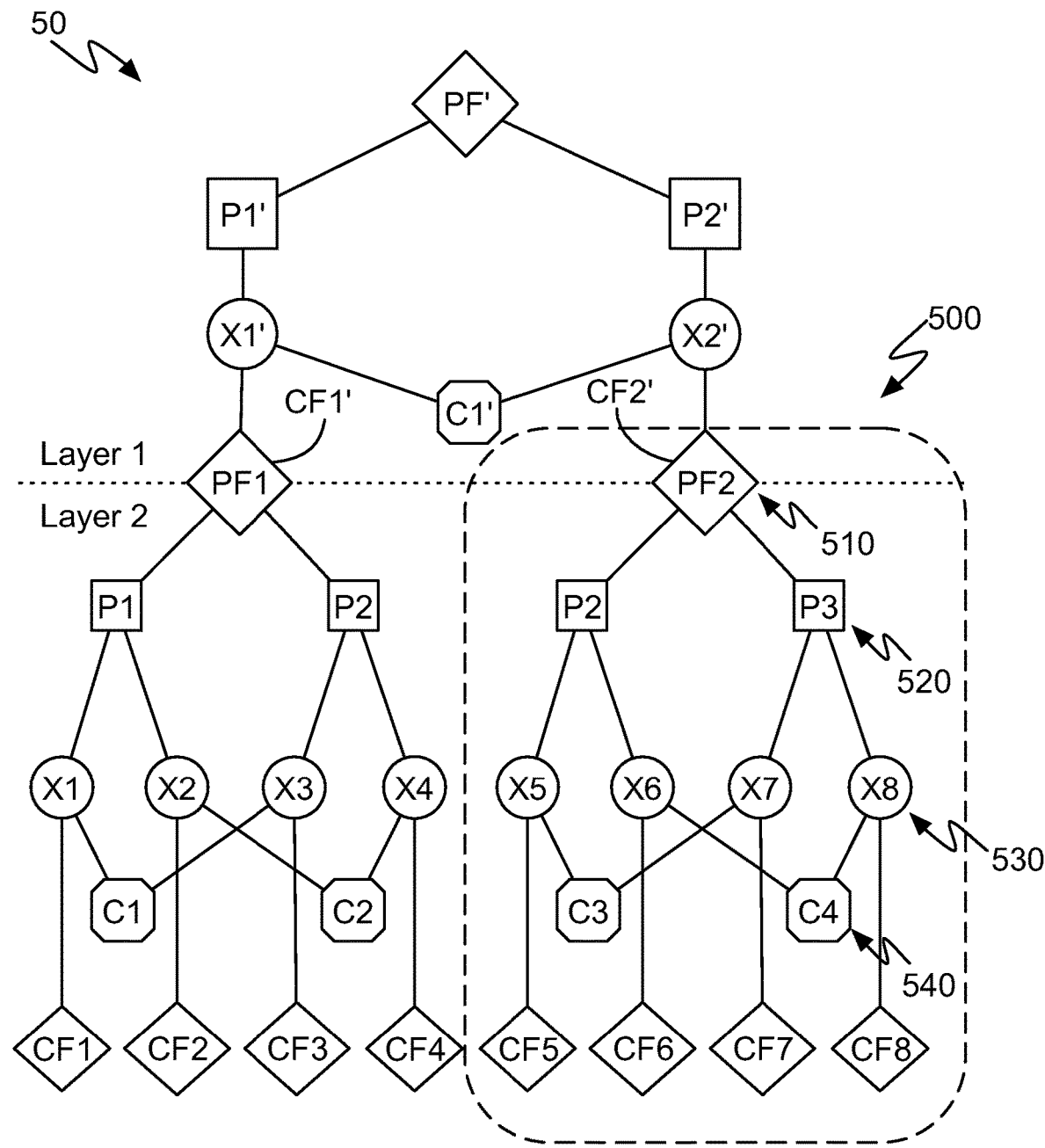
FIGS. 5A and 5B are schematic representations of variants of the hierarchy.
Figure 5B:
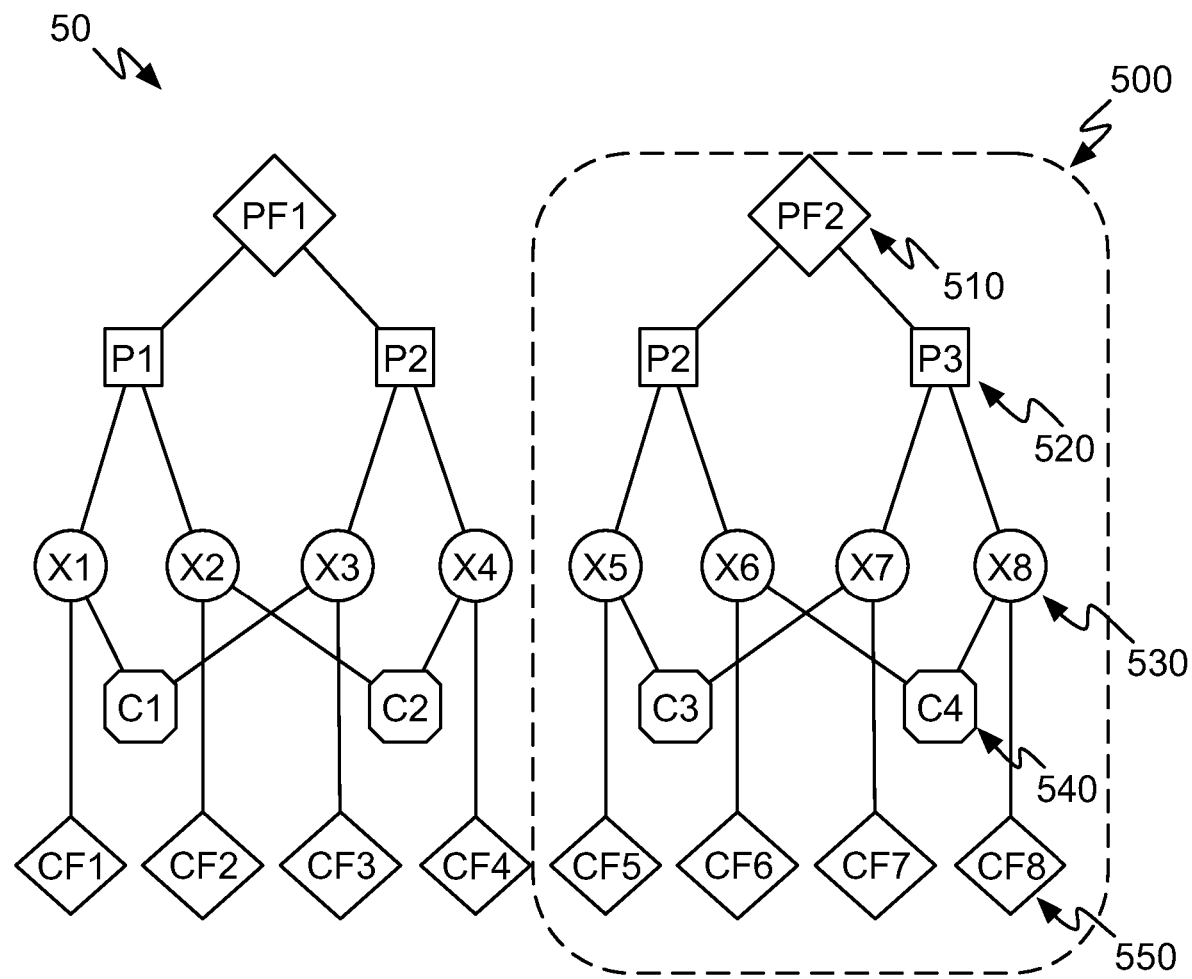

In a first variant, the vision hierarchy is a recursive cortical network 50 (RCN). As shown in FIGS. 5A and 5B, the RCN includes a plurality of sub-networks 500. A sub-network preferably includes at least a parent feature node ("PF") 510, a pool node ("P") 520, a parent-specific child feature node ("X") 530 (or PSCF node for short), and at least a constraint node ("C") 540, but can additionally or alternatively include a child feature node ("CF"), and/or any other suitable node. PSCF nodes preferably connect to a child feature node (CF1, CF2, CF3, CR4, CF5, CF6), but can be connected to any other suitable node, unconnected, and/or otherwise connected. The network in one sense is a network of distributed processing elements that implement summation, multiplication, exponentiation or other functions on its incoming messages/signals. Patterns can be inferred and/or generated by propagating node activation through the network. The network, which can be modeled as a neural network or a Bayesian network, can be enabled and implemented through a variety of implementations. In a first implementation, the system is implemented as a network of electronically coupled functional node components. The functional node components can be logical gates arranged or configured in a processor to perform a specified function. In a second implementation, the system is implemented as a network model programmed or configured to be operative on a processor. The network model is preferably electronically stored software that encodes the operation and communication between nodes of the network. Additionally, the network 50 can be configured for different operational modes, including a first mode of operation: generation mode, and a second mode: inference mode. The network 50 is preferably a hierarchically organized network of interconnected sub-networks in various parent-child relationships as shown in FIG. 5A, but can be otherwise structured. The network may alternatively be a single layer of a collection of sub-networks as shown in FIG. 5B or a single sub-network. In examples, the recursive cortical network (RCN) can have repeated sub-network patterns used in implementing a unique form of a neural network—a cortical network.

In a specific example, the RCN includes a recursively architected network of sub-networks organized into a plurality of hierarchical layers. The sub-networks comprising at least a parent feature node, a pool node, a parent-specific child feature (PSCF) node, and a child feature node. The parent feature node of at least one sub-network configured with a selection function actionable on at least two pool nodes connected to the parent feature node of the at least one sub-network. The pool node of the at least one sub-network configured with a selection function actionable on at least two PSCF nodes connected to the pool node of the at least one sub-network. The PSCF node of the at least one sub-network configured to activate a connected child feature node.

In a second specific example, the vision hierarchy can be the RCN as described in U.S. application Ser. No. 13/895,225, incorporated herein in its entirety by this reference.

In a third specific example, the vision hierarchy can be the RCN disclosed in D. George, W. Lehrach, K. Kansky, M. Lázaro-Gredilla, C. Laan, B. Marthi, X. Lou, Z. Meng, Y. Liu, H. Wang, A. Lavin, D. S. Phoenix, A generative vision model that trains with high data efficiency and breaks text-based CAPTCHAs. Science 358, eaag2612 (2017), incorporated herein in its entirety by this reference.

In a second variant, the vision hierarchy is a deep neural network generative model.

However, the vision hierarchy can additionally or alternatively include any other suitable component, and/or be otherwise structured.

The VCC preferably includes one or more working memories. The working memory can include the simulation memory 330, the fixation memory 340, color indexing memory 310, object indexing memory 320, but can additionally or alternatively include any other suitable memory. The working memory can be stored in computer readable media. The working memory is preferably local to the VCC, but can additionally or alternatively be remote (e.g., located at a server, at a remote processing system, etc.), and/or be otherwise positioned. The working memory is preferably short-term (e.g., specific to a session such as an execution session, training session, specific to execution and/or training of a specific training data, etc.), but can additionally or alternatively be long-term (e.g., extend across multiple program induction sessions, execution sessions, etc.).

The working memory is preferably structured, but can additionally or alternatively be unstructured. The structure can be based on content (e.g., objects, object attributes, scene characteristics, etc.), locality to the system component (e.g., enforces structured access), but the working memory can be additionally or alternatively otherwise structured.

The working memory can be accessed by system components (e.g., for individual primitive function sets). The working memory can be read from and written to by primitive functions, but the working memory can be additionally or alternatively otherwise accessed. Primitive functions are preferably prespecified, but can additionally or alternatively be otherwise specified.

In variants, each system component and/or one or more primitive functions can be associated with a specific set of working memory (e.g., limited set of working memory). However, the primitive functions for a given system component can reference and/or write to any working memory. In examples, fixation controller instructions can reference (read from) only the fixation memory; vision hierarchy instructions can reference and/or write to the object indexing memory, the color indexing memory, and/or the simulation memory; object indexer primitive functions can reference only the object indexing memory and/or the color indexing memory; and robot controller instructions can write to only the simulation memory. However, the primitive functions for different components can be otherwise related to the working memory.

However, the working memory can additionally or alternatively include any other suitable component, and/or be otherwise used.

The VCC preferably includes one or more simulation memories (e.g., imagination blackboard). The simulation memory can function to simulate the working region's state. For example, the simulation memory can simulate the initial, intermediate, and/or end states of one or more objects within the working region before, during, and/or after manipulation by the VCC components based on the program (e.g., "imagined actions"). The simulation memory can additionally or alternatively allow details of object to be accessed via interactive querying. The simulation memory can additionally or alternatively store intermediate object states (e.g., during program simulation and/or execution). However, the simulation memory can perform any other suitable set of functionalities.

The simulation memory is preferably topographically organized but can additionally or alternatively be otherwise organized. The simulation memory preferably differentiates between real and imaginary objects (e.g., with a flag such as a binary flag). The simulation memory is preferably a 2D geometry engine, but can additionally or alternatively be a 3D geometry engine, a database, and/or any other suitable simulation medium. The simulation memory can represent the objects in 2D, 3D, and/or any other suitable set of dimensions. The simulation memory is preferably nonvolatile memory, but can be volatile, or any other suitable memory. The simulation memory is preferably reset for each: program induction session (e.g., each new initial-target pair or training data set), program induction instance within a program induction session, and/or each execution instance, but can be otherwise reset.

The simulation memory preferably interfaces with the dynamics model (e.g., object dynamics due to agent manipulation are simulated within the simulation memory based on the dynamics model), the vision hierarchy (e.g., objects are populated and/or manipulated within the simulation memory by the vision hierarchy), indirectly or directly with the fixation controller (e.g., wherein the simulation memory simulates the field of view, within the working region, that is specified by the fixation controller); indirectly or directly with the attention controller (e.g., wherein the attention controller specifies which objects to simulate), but can additionally or alternatively interface with any other suitable component.

The VCC can include one or more fixation memories. The fixation memory is preferably a data structure. The fixation memory preferably includes a history of fixation locations (e.g., next fixation state, previous fixation state, etc.), but can additionally or alternatively include information related to the agent at the location such as height information, positioning information, and/or include any other suitable information. The fixation memory is preferably operable with the fixation controller, but can additionally or alternatively be operable with any other suitable component. The fixation memory can store locations of the fixation controller (e.g., periodically during fixation controller movement, after the fixation controller reaches a location (stops moving), and/or store locations at any other suitable time). The locations can be associated with states (e.g., next state, previous state, etc.), associated with agent information, and/or associated with any other suitable information. The locations can be determined by the program, determined by the simulation memory, and/or otherwise determined.

In one variant, the current state of the fixation controller can be determined based on a pointer in the fixation memory. When primitive functions associated with the fixation controller are executed, the fixation memory can provide the fixation controller with the associated information (e.g., location information). For example, if the next state function is executed, the fixation memory can determine the location associated with the next state by accessing the pointer of the current state, and identifying the next sequential location in memory. The fixation memory can communicate the location, to the fixation controller, and the fixation controller can execute the primitive function.

In second variant, if the fixation memory sends a new location (e.g., next state, previous state) to the fixation controller, the pointer associated with the current location can be updated when the agent reaches the new location (e.g., by sampling location information such as images, coordinates, etc.). In a third variant, a user can guide the fixation controller, wherein the location associated with the user's guidance can be stored in fixation memory.

The VCC preferably includes one or more object indexing memories. The object indexing memory can function to store an index for some and/or all objects in a scene (object index). The object index can index objects, colors, or any other suitable feature.

The object indexing memory is preferably a data structure that stores object shape information of a scene. The shape information can be determined by the visual hierarchy, by the feature extractor, and/or by any other suitable component. The objects within the index can have a priority, can be ordered according to their distance from the center of fixation (e.g., determined by the fixation controller), but can additionally or alternatively be ordered based on a set of rules (e.g., raster order), and/or otherwise ordered. The objects within the index can be limited to: attended objects only (e.g., objects identified by the attention controller), objects within the field of view specified by the fixation controller, all objects, and/or any other suitable set of objects.

The object indexing memory can have associated instructions (e.g., to manage object indexes) from the instruction set (e.g., loop start, loop end, next object, etc.) that control object index memory operation and/or output.

In one example, loop start can function to mark the start of a loop that iterates over the objects that are currently being attended to. To prevent infinite loops, the loop body is required to contain a next object instruction and can be forbidden from having a reset attention instruction. These can be enforced as syntax checks during program induction.

In a second example, loop end can function to mark the end of a loop. Instructions within the loop body can be executed until the end of the object iterator is reached, but can be otherwise executed.

In a third example, next object can function to advance the object iterator in the object-indexing memory, but can additionally or alternatively provide any other suitable set of functionalities.

The object indexing memory preferably interfaces with the vision hierarchy (e.g., local, remote, or be otherwise positioned). The vision hierarchy can write object attributes to the object indexing memory, and can optionally read object attributes from the object indexing memory (e.g., for simulation). In one example, the objects can be represented as points with a set of associated attributes (e.g., visual attributes). In a second example, the objects can be represented as a set (e.g., hierarchy) of object attributes. In a third example, the objects can be represented by object identifier, wherein the object identifier references specific objects' attributes stored within the vision hierarchy. However, the objects can be otherwise represented within the object indexing memory. The object indexing memory can optionally interface with the attention controller. For example, the attention controller can specify attended objects (e.g., within the object index), wherein only the attended objects can be iterated over for program simulation, evaluation, and/or execution. The object indexing memory can optionally interface with the fixation controller, wherein the objects within the object index are dynamically re-ordered (e.g., based on the current object states, as determined from the simulation memory; based on the initial object states, etc.) in response to reference point change by the fixation controller. The object indexing memory can optionally interface with and/or include an object indexer that iterates over the object index (e.g., based on the object index primitive functions and/or argument values). The object indexing memory can additionally or alternatively interface with any other suitable component in any other suitable manner.

The VCC preferably includes one or more dynamics models 223 (e.g., physics simulators). The dynamics model preferably functions to manipulate objects in a cartesian plane; simulates geometry of the scene; and/or simulates object physics; but can additionally or alternatively perform any other suitable set of functionalities. The dynamics model preferably includes attribute information for each object (e.g., object attribute information can be position, shape, color, size, etc.), but can additionally or alternatively include movement information, occlusion information, surface representation information, and/or any other suitable information.

In one variation, the dynamics model can be the dynamics model discussed in K. Kansky, T. Silver, D. A. Mély, M. Eldawy, M. Lázaro-Gredilla, X. Lou, N. Dorfman, S. Sidor, S. Phoenix, D. George, Schema networks: Zero-shot transfer with a generative causal model of intuitive physics, in International Conference on Machine Learning (ICML, 2017), pp. 1809-1818, incorporated herein in its entirety by this reference.

In a second variation, the dynamics model can be a neural network (e.g., fully connected networks, GANs, RNNs) configured to predict object movement information.

In a third variation, the dynamics model can be a reinforcement learning algorithm (e.g., Q-learning, policy iteration, SARSA, Deep Q networks (DQN), and/or any other suitable reinforcement learning algorithm) configured to predict object movement.

In a fourth variation, the dynamics model can be a probabilistic model (e.g., Markov model, Bayesian network, stochastic model, etc.) configured to predict object movement.

However, the dynamics model can be a set of equations or be otherwise configured.

The dynamics model can be used with the vision hierarchy, wherein the VCC can make predictions regarding the effect of simulated object movement. For example, the VCC can simulate the dynamics and/or interactions of an object given a set of agent instructions (e.g., determined by the program) and the object attributes (e.g., determined by the vision hierarchy). However, the object movement predictions can be otherwise determined. The predictions can be recorded in the simulation memory, and/or be otherwise recorded/stored. However, the dynamics model can be additionally or alternatively used with any other suitable component.

The VCC preferably includes one or more fixation controllers 224. The fixation controller preferably functions to position a reference point (e.g., center of a visual field, corner of a visual field, dynamically-selected point relative to a visual field, etc.) within an input using fixation movements (e.g., fixation instructions). In one example, the fixation controller positions the center of the vision field within the input scene. In a second example, the fixation controller can use fixation memory to drive the center of the "eye" to previously visited locations.

The fixation controller can be an algorithm (e.g., deterministic, supervised, unsupervised, neural network, regression, etc.), an external agent, mechanical component configured to control fixation, but can additionally or alternatively be otherwise determined. The fixation controller can have associated instructions from the instruction set (e.g., fixate next state, fixate previous state, etc.) that control fixation controller operation.

In one example, fixate next state can function to move fixation to the next fixation location in the fixation memory, but can additionally or alternatively provide any other suitable functionalities.

In a second example, fixate previous state can function to move fixation to the previous fixation location in the fixation memory, but can additionally or alternatively provide any other suitable functionalities.

In a third example, fixate attended object can function to move the fixation to the object that is currently being attended to.

In a fourth example, fixate pointer can function to move the fixation to the pointer in the input scene (e.g., the pointer can be the attention controller).

In a fifth example, fixate location can function to move the fixation to one of the positions supplied as arguments (e.g., top, bottom, right, left, center, etc.). Fixation movements can force a re-ordering of the objects in the object-indexing memory and/or color-indexing memory, but can additionally or alternatively affect other system components.

The fixation controller can interface with and/or include the attention controller, but can additionally or alternatively include any other suitable component. The fixation controller can interact with (e.g., read and/or write to) the fixation memory, can be coupled to program induction engine, but can additionally or alternatively interact with any other suitable component.

The VCC preferably includes one or more attention controllers 222. The attention controller preferably functions to filter objects using their color and/or shape; and/or set the current attention of an object based on the object attributes; but can additionally or alternatively perform any other suitable set of functionalities.

The attention controller is preferably a top down attention mask (e.g., binary, forced zeros, etc.), wherein the mask can define or specify a single object (e.g., pixels corresponding to object edge, all object pixels, etc.), but can additionally or alternatively be a bottom up attention mask, a neural network (e.g., attention LSTM from feature map, recurrent attention model, etc.).

The attention controller can have associated instructions from the instruction set (e.g., set shape attention, set color attention, reset the attention, etc.) that control attention controller operation and/or output.

In one example, set shape attention can function to set attention to the type of shape supplied in the argument. Setting the attention can affect the objects that are being iterated over using the object-indexing memory. Although a set (e.g., all, subset) of objects in the scene will be present in the simulation memory, only the objects that are attended to can be iterated over. For example, if the attention is set to 'square' objects, then calling a next object will advance the iterator such that it will point to the next square-shaped object within the scene, ignoring the other objects. Reset attention can be used to remove the effect of set shape attention and restore the iterator to the set of objects in the scene.

In a second example, set color can function to sets attention to objects of the color supplied in the argument. Setting the attention can affect the objects that are being iterated over using the object-indexing memory. Although a set (e.g., all, subset) objects in the scene will be present in the simulation buffer, only the objects that are attended to can be iterated over. For example, if the attention is set to 'red' objects, then calling a next object will advance the iterator such that it will point to the next red-colored object within the scene, ignoring the other objects. Reset attention can be used to remove the effect of set shape attention and restore the iterator the set of objects in the scene. Set color attention and set shape attention can be used in conjunction to iterate over specific shape-color combinations, but can additionally or alternatively be otherwise used.

In a third example, reset the attention can function to remove the effect of set color attention and set shape attention; restore the iterator to all objects in the scene; and/or provide any other suitable set of functionalities.

The attention controller can affect the objects placed in the simulation memory, can affect which objects are available for iterating over, but can additionally or alternatively otherwise affect the system.

In one example, the attention controller is a pointing mechanism to reference objects in the simulation memory.

In one variant, the attention controller is external from system, and can interact with system by directing the system's attention with a pointer (e.g., top down attention mask).

The VCC preferably includes one or more attention gating mechanisms 226. The attention gating mechanism preferably functions to bind an object with object attributes (e.g., shape, color, etc.); functions as an internal pointing mechanism to reference objects in the simulation memory; functions to segment objects from background; but can additionally or alternatively perform any other suitable set of functionalities.

In one example, the attention gating mechanism uses top down attention (e.g., to determine the relevant object attributes for the next transformation), but can additionally or alternatively include bottom up attention, self attention, attention neural network, and/or any other suitable attention mechanism.

The attention gating mechanism is preferably a top down attention mask (e.g., binary, forced zeros, etc.), mask can define a single object (e.g., pixels corresponding to object edge, all object pixels, etc.), but can additionally or alternatively include bottom up attention, self attention, neural network based attention (e.g., attention LSTM from feature map, recurrent attention model, etc.), and/or include any other suitable attention mechanism and/or segmentation algorithm (segmentation based on clustering such as k-nearest neighbors; segmentation based on edge detection; segmentation based on supervised learning such as CNN, etc.), or any other suitable algorithm.

The attention gating mechanism preferably interfaces with the attention controller (e.g., which dictates the objects to attend to), simulation memory (e.g., to which the attributes of the attended-to object are read and/or written), vision hierarchy (e.g., the data source to which the attention gating mechanism is applied), but can additionally or alternatively interface with any other suitable component.

In one variant, the attention gating mechanism is top down attention gating. In a second variant, the attention gating mechanism is top down attention gating and bottom up attention gating, but can additionally or alternatively be any other suitable combination of attention mechanisms.

The VCC preferably includes one or more agents 227. The agent preferably functions to position an associated manipulator (e.g., physical manipulator) relative to objects and the visual field, but can additionally or alternatively output a virtual or physical manipulator pose (e.g., position and/or location). The manipulator preferably manipulates the objects, and can retain (e.g., grab), release, and move objects (e.g., left, right, up, down, etc.) in the physical world, simulated world, virtual world, but can otherwise manipulate objects. The agent is preferably generic to multiple manipulators, but can additionally or alternatively be specific to a single manipulator or set thereof. When the agent (and associated instructions) are generic, each instruction can optionally be translated to manipulator functions (e.g., machine code or bytecode readable by the manipulator) that are specific to said manipulator (e.g., by a set of manipulator translation modules).

The agent can have associated instructions from the instruction set (e.g., grab object, release object, move hand to fixation, move hand to pointer, move hand left, move hand right, move hand up, move hand down, move hand to attended object, etc.) that function to control the agent's manipulator.

In one example, grab object function to grab the object that is below the controller (e.g., hand). The instruction can raise an exception if the hand is not over an object, if the hand is already holding an object, and/or at any other suitable time.

In a second example, release object can function to release the object that is currently held in the controller at the location the hand is in. The instruction can raise an exception if the hand is not holding an object, and/or at any other suitable time.

In a third example, move hand to fixation can function to move the hand to the current location of fixation. Any object that is held in the hand will move with it, and the movement can stop if the object collides with any other object en route (e.g., based on the vision hierarchy).

In a fourth example, move hand to pointer can function to move the hand to the location marked by the pointer. Any object that is held in the hand will move with it, and the movement can stop if the object collides with any other object en route. The instruction can raise an exception if a pointer is not part of the input image, and/or for any other suitable reason.

In a fifth example, move hand left/right/up/down can function to move the controller (e.g., hand left/right/up/down in a straight line until it collides with the boundary of the workspace. Any object that is held in the controller will move with it. The movement can stop if the object collides with any other object and/or element (e.g., fixture configured to the workspace), when the object collides with the boundary of the workspace, and/or at any other suitable time.

In a sixth example, move hand to attended object can function to move controller (e.g., hand) to the top of the currently attended object in a straight line from the current position of the controller. If the controller is not holding an object, it can stop when the position of the controller coincides with the center of the object. Any object that is held in the hand will move with it. The movement can stop if the object collides with any other object en route, or with the attended object, and/or at any other suitable time. The instruction can raise an exception if the hand is already at the attended object, and/or at any other suitable time.

The agent can interface with the dynamics model (e.g., wherein the dynamics model determines the dynamics and/or effects of the current and/or next agent instruction), simulation memory (e.g., wherein the agent and/or agent's effect on the objects are written to the simulation memory), and/or any other suitable component.

However, the VCC can additionally or alternatively include any other suitable components.

4. Method.

The method can include generating a program for an initial-target pair, which functions to determine a program comprising primitive function that can be executed by the agent. The method is preferably performed by the program induction engine, by interfacing with the VCC, but can additionally or alternatively be performed by any other suitable system. The method can optionally include executing the program for an unspecified input. The method is preferably performed during an active session (e.g., during training, during execution, etc.), but can be performed at any other suitable time. The method preferably uses the set of instructions to generate programs in training, then, in execution, the program (e.g., associated with a selected concept) is executed by the system.

Figure 8:
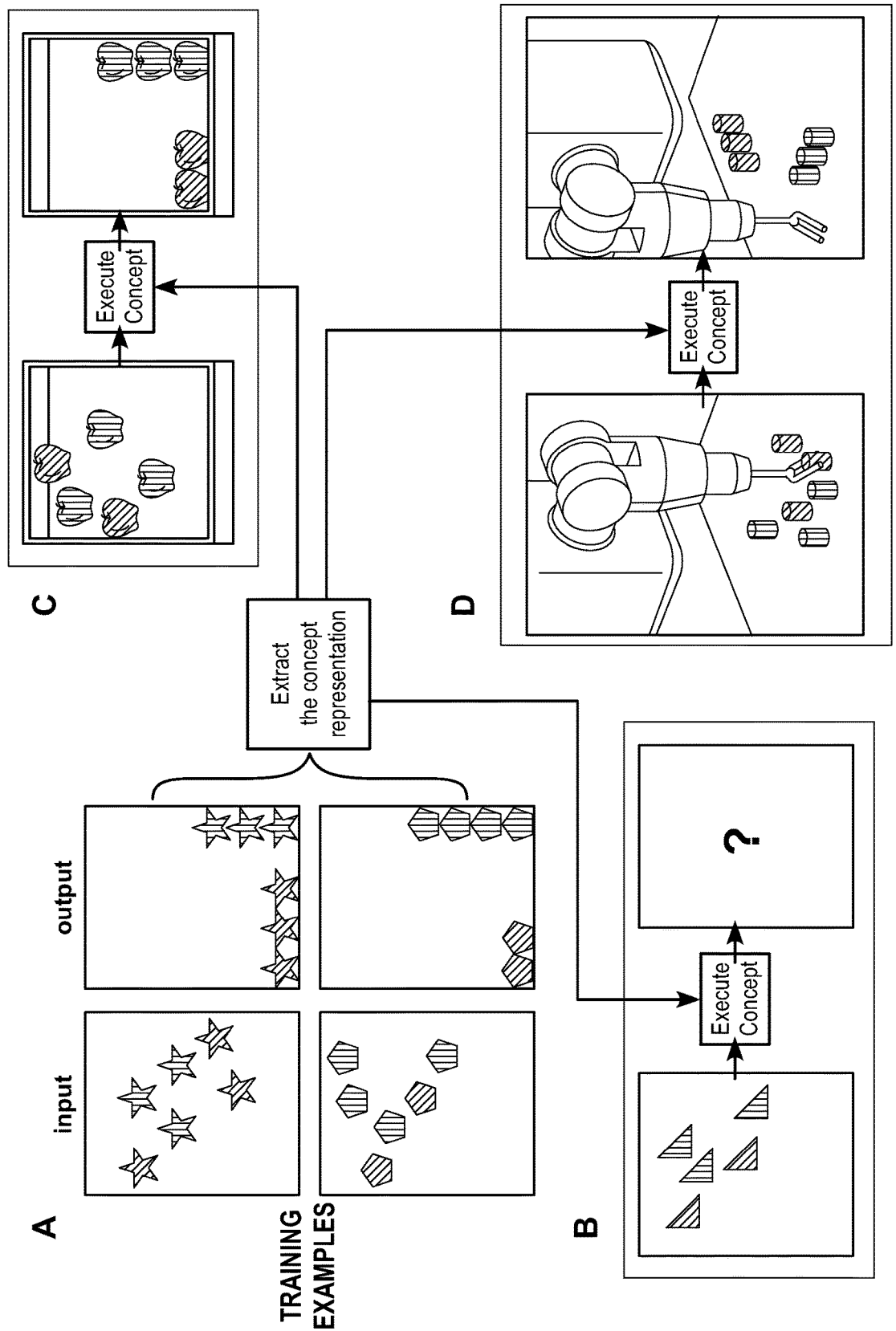
FIG. 8 is an example of the method.

One example of the method is shown in FIG. 8. Training data (examples) for the task of moving green objects to the bottom edge (starting on the left) and stacking red objects along the right edge (starting on the bottom) is received by the program induction engine. The program induction engine extracts the concept representation by iteratively determining a set of candidate programs and evaluating the programs (e.g., full programs, partial programs, etc.) with a score (e.g., probability, proximity of the program-created end state to target scene, proximity of the program-created intermediate state to target scene, etc.). Executing the concept can include receiving an initial image/scene and executing the task learned during program induction. The task can be a full task (e.g., program-created end state, a partial task (e.g., program-created intermediate state), and/or any other suitable task. Executing the task can include simulating the concept, executing the concept by a robot (e.g., hand controller), and/or otherwise executing.

In a specific example, the program can arrange small circles into a big circle (e.g., example shown in FIG. 6). Arranging circles in this way can include the VCC imagining an object that does not exist (the big circle) and then pushing other objects toward this imagined object (e.g., using the agent) while the imagined object is maintained in the working memory (e.g., in the simulation memory).

The method can additionally or alternatively include extracting features from the input image S100. S100 preferably functions to determine feature vectors from each image, but can additionally or alternatively determine feature vectors across images, across an image set, and/or for any other suitable set of data. S100 preferably determines feature vectors from the initial-target pair, wherein the feature vectors can be used as (or to determine) arguments for the induced programs. S100 can optionally determine feature vectors for the current image(s) used during program execution. The feature vectors can include object attributes and color attributes, but can additionally or alternatively include any suitable feature. The feature vectors can optionally include difference feature vectors between input and target images. S100 is preferably performed by the vision hierarchy, but can additionally or alternatively be performed by the feature extractor and/or any other suitable component. S100 is preferably performed before argument prediction for a given primitive function; but can additionally or alternatively be performed during training of the generative model or at any other suitable time.

S100 preferably ingests a single image at a time, but can additionally or alternatively ingest: a single initial-target pair, multiple initial-target pairs, pixel channels associated with the initial image, the target image, or any other suitable image. The input is preferably received from an external agent, but can additionally or alternatively be otherwise determined.

For example, the input can be converted to each image's respective RGB channels. Each channel can be processed by the feature extractor.

The output feature(s) can be one or more difference feature vectors, input feature vectors, target feature vectors, and/or any other suitable feature vector, encodings of input, target and/or difference images/channels/vectors, but can additionally or alternatively be any other suitable data structure.

In one example, S100 includes, for each training data example: converting the input(s) (e.g., initial image, target image, etc.) to a 3D binary array, but can additionally or alternatively be a plurality of 2D arrays, or any other suitable data representation. The first dimension of the 3D binary array can be the number of channels (e.g., 10, 20, 21, 30, etc.). A first predetermined set (e.g., subset of the number of channels) of channels of the array can be based on the input images. Each element is set to 1 or 0, depending on whether the feature associated with that channel is present at that location or not, respectively. The next predetermined set of channels can be based on the difference between input and target images, both using the same binary encoding, which results in the elements of these channels having $-1$, 0, and 1 as possible values.

However, S100 can additionally or alternatively include any other suitable elements.

The method can additionally or alternatively include determining primitive function arguments S200. S200 preferably functions to determine an arguments and/or argument values for an instruction in the generative model. S200 can additionally or alternatively function to determine argument values during program execution. S200 is preferably performed by the program induction engine, preferably the discriminative model, but can additionally or alternatively be any other suitable component. S200 can be performed: during program induction, generative model training, during execution (e.g., based on the input scene), or be performed at any other suitable time.

S200 preferably determines the argument values based on the output of S100 (e.g., feature vectors, image channels, etc.), but can additionally or alternatively determine the argument values based on fixation guidance information (e.g., from the fixation controller, fixation memory, etc.), based on the input images (e.g., initial image, target image, current image, etc.), and/or include any other suitable information.

The input is preferably used to determine primitive function arguments. Primitive function arguments can be determined by search methods (e.g., exhaustive search, selective search such as conditioned on the primitive function, conditioned on object information, etc.; prediction algorithms such as a discriminative model, etc.), prediction (e.g., using discriminative models or neural networks), and/or otherwise determined. In one example, specific argument values are predicted for each instruction, and are conditioned on the specific initial-target pairs that the program is being induced for. The primitive function arguments are preferably argument values (e.g., parameter values for the primitive function), but can additionally or alternatively be variable identifiers and/or any other suitable data structure. The argument value is preferably used by the generative model during the exploration phase, but can additionally or alternatively be used during the compression phase, during candidate program determination, during candidate program evaluation, during execution, or at any other suitable time.

However, S200 can additionally or alternatively include any other suitable elements.

Figure 7:
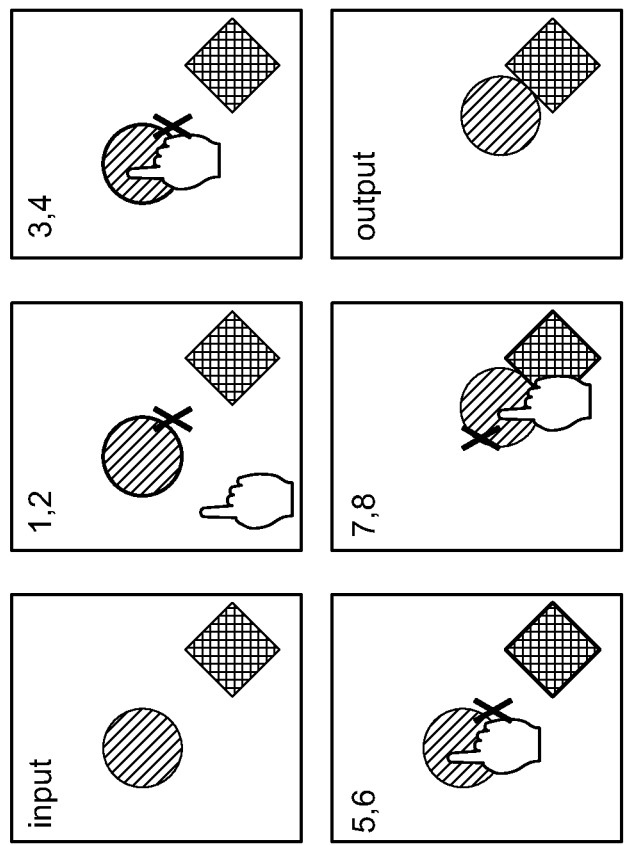
FIG. 7 is an example of a program.

The method preferably includes determining a set of candidate programs S300 (program induction). S300 is preferably performed by the program induction engine, more preferably the generative model interfacing with the discriminative model and the VCC, but can additionally or alternatively be performed by any other suitable system components and/or any other suitable system. S300 is preferably performed iteratively, but can additionally or alternatively be determined once, be determined without feedback, and/or otherwise determined. S300 is preferably performed before program execution, but can additionally or alternatively be performed at any other suitable time. An example of a generated/determined program is depicted in FIG. 7. The candidate programs can have a maximum length (e.g., 4, 6, 8, etc.), a predetermined set of instructions, and/or satisfy any other suitable set of conditions.

Different programs are preferably induced for each training data set; however, the same program can be induced for multiple training data sets. Candidate programs are preferably induced individually (e.g., in series, in parallel) for each initial-target pair within each training data set, but can additionally or alternatively be induced as a batch, iteratively induced (e.g., wherein a set of candidate programs induced for a first initial-target pair can be used for, evaluated, and/or updated for a second initial-target pair), or otherwise induced.

S300 preferably includes: determining a set of related instructions, wherein the instructions that accept or require arguments each include a set of candidate argument values; and determining a set of candidate programs based on the set of related instructions. However, the candidate programs can be otherwise determined.

Determining the set of related instructions functions to generate a search space for candidate program searching. The instructions within the set, the intra-set instruction ordering, and the relationships between the instructions (e.g., inter-instruction probability and/or instruction-argument probabilities) can be determined: using one or more neural networks, using reinforcement learning, using an explore-compress framework, and/or otherwise determined. The instructions are preferably probabilistically related (e.g., wherein an inter-instruction transition is associated with a predetermined probability), but can be deterministically or otherwise related. In variants, subroutines (e.g., sequence of atomic instructions) can be substituted for one or more instructions (e.g., when the subroutine repeatedly appears in the program for the concept or other concepts). The arguments are preferably probabilistically related to the respective instruction (e.g., wherein an instruction-argument value transition is associated with a predetermined probability), but can be deterministically or otherwise related. For example, the instruction set and the argument values can be organized in a tree structure or a Markov chain (e.g., as shown in FIG. 9). The starting point (e.g., object) can be determined by the attention controller an external agent and/or any other suitable entity.

The inter-instruction probability and/or instruction-argument probabilities can be determined based on the input image's attributes (e.g., feature values), but can additionally or alternatively be determined based on any other suitable input.

The set of related instructions (and relationships) are preferably determined by a generative model, but can additionally or alternatively be determined by a discriminative model or any other suitable model. In one example, the inter-instruction transitions and associated probabilities are determined by a generative model; the instruction-argument value relationships are determined by the instruction set; and the instruction-argument value probabilities are determined by one or more discriminative models (e.g., a different discriminative model for each instruction). In a specific example, the inter-instruction probabilities are determined on the basis of (prior) generative models trained on already-found programs, and instruction-argument value probabilities are determined by discriminative models that are conditioned on current inputs (e.g., the current initial image). However, the input to S300 can additionally or alternatively be otherwise determined.

Determining candidate programs functions to determine programs that transform the working region's state, represented in the initial image, into the working region's state represented in the target image. The candidate programs are preferably determined by traversing the set of related instructions, but can be otherwise determined. In one example, the set of related instructions are traversed from an initial node, associated with the initial image or an initial starting position determined based on the initial image, to reach an end node (e.g., success node, failure node, exception node, etc.), wherein the end node is associated with the target image or a target end position determined based on the target image.

In one example, S300 can include searching the set of related instructions for programs in decreasing order of probability (e.g., wherein the probability of a program depends on the weights of the branches leading to the end node).

In a second example, S300 can include optimizing the search for one or more parameters (e.g., length, proximity of the end state to the target image, etc.). However, S300 can include using a beam search, BFS, DFS, iterative deepening search, neural network based search, exhaustive search, selective search, A-star search, any other suitable search, and/or otherwise determined.

In a specific example, the search is additionally guided by the result of the execution of a partial program. The program-generated intermediate state (e.g., scene obtained after the execution of a partial program) is compared with the target scene to assess the distance to the program-generated end state. The distance (distance value) can be computed object by object, scene to scene, or otherwise determined. The distance can be Euclidean topographic and/or otherwise determined. This distance can be combined with the probabilities obtained from the Markov chain (e.g., edge transition probabilities of the tree structure) to obtain a heuristic value (e.g., the heuristic value can be calculated or otherwise determined based on the distance value and the inter-instruction transition and/or instruction-argument probabilities for the partial program). The heuristic value can be a real number that provides a rough estimation of how close the partial program is to a full program for the scene pair, but can be otherwise defined. During program induction and/or program evaluation, programs with a smaller heuristic can be prioritized in the search algorithm. The search algorithm can be A-star, best first search, and/or any other suitable search algorithm.

The program can be induced for each object in the initial image in series, in parallel, or in any other suitable order. In one example of serial object program induction, the attention controller can pick a first object (e.g., selected by the attention controller from the object indexing memory) and traverse the instructions of the decision tree by picking the highest probable path. If at the endpoint of the tree, the object is in the correct position (e.g., as determined based on object manipulation simulation within the simulation memory by the vision hierarchy), the object indexing memory can freeze the first object, and the attention controller can select the next object. The program determined for the first object can be applied to the next object, and a new program induced for the next object if the first object's program did not result in the target state. The object indexing memory and attention controller can interface in this way until all objects are moved to their target locations, and/or otherwise interface.

S300 can optionally include updating the generative model, which functions to refine the generative model for program induction. The generative model can be: generic (e.g., working as an input-agnostic prior for the space of future programs given the concepts learned earlier), specific to a test data set, generic, or otherwise related to the test data sets and/or concepts. The generative model can be updated using: an explore-compress framework, reinforcement learning, and/or otherwise updated. In one example, the generative model is updated (e.g., with modified instruction chains and/or inter-instruction probabilities) using an explore-compress framework, wherein the induced programs (e.g., guided by the old generative model in the explore phase) are used to update the generative model in the compress phase.

The output of S300 is preferably discovered candidate programs (e.g., discovered sequences of instructions). The discovered candidate programs are preferably based on examples shown to the model, but can additionally or alternatively be based on heuristics, and/or be otherwise based. The candidate programs can be stored in the program dataset, but can additionally or alternatively be otherwise stored.

Figure 10:
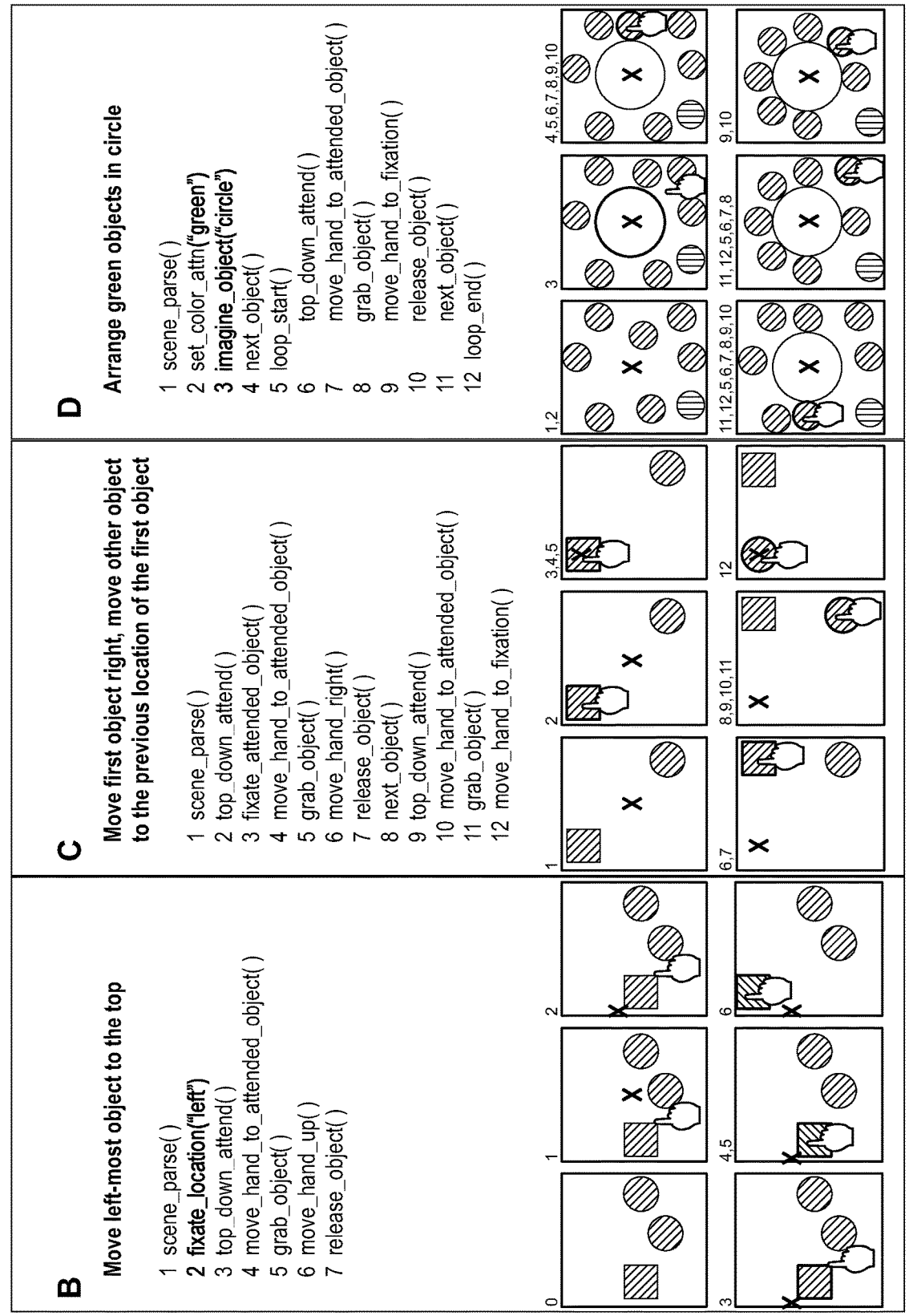
FIG. 10 depicts examples of programs.
Figure 11:
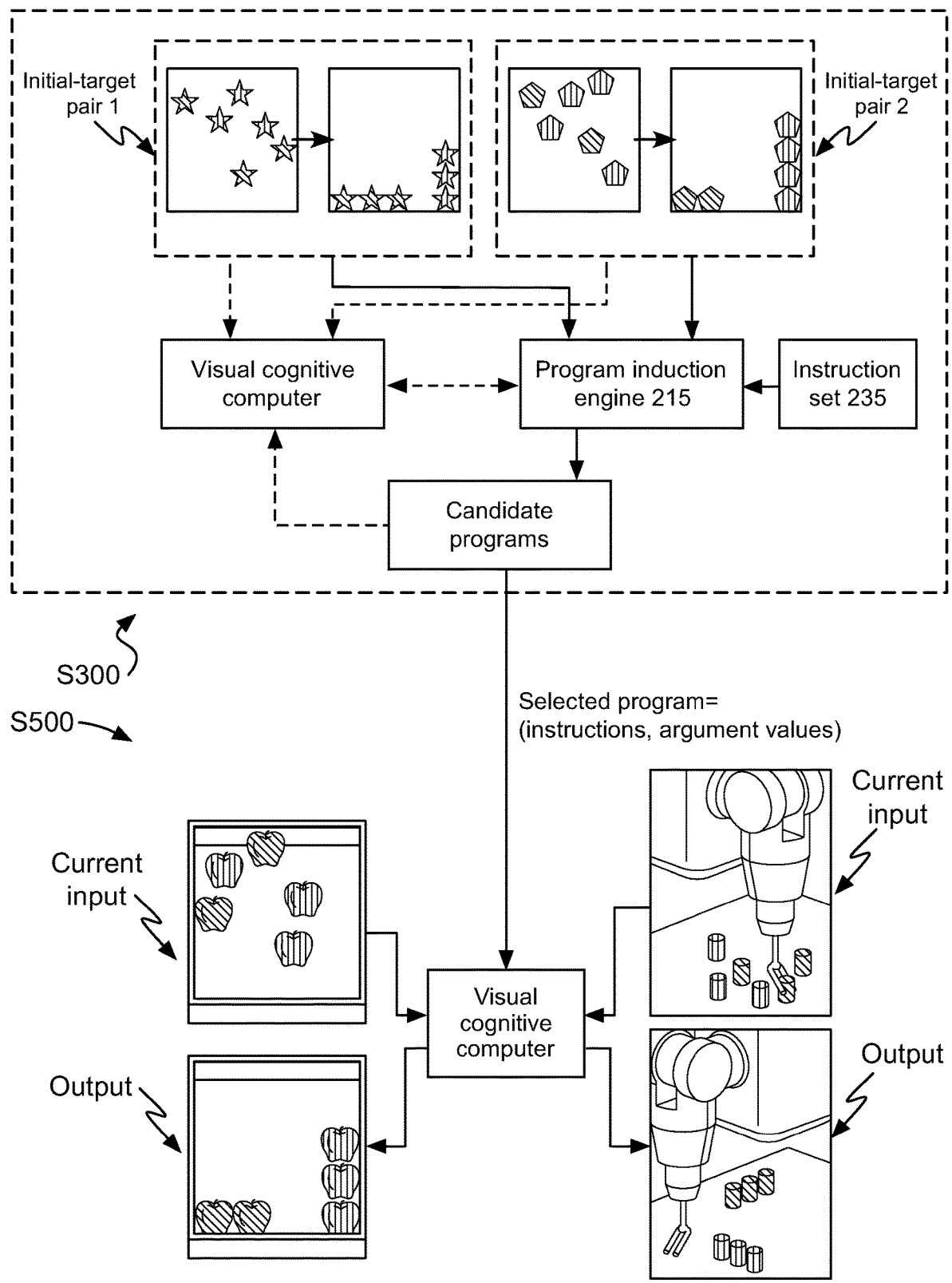
FIG. 11 is an example of the method.

Example programs of S300 (and associated simulated intermediate working region and/or object states) are depicted in FIG. 10.

However, S300 can be otherwise performed.

The method can additionally or alternatively include evaluating each candidate program S400. S400 preferably functions to select a program for a given training data set (e.g., concept) from candidate programs determined in S300. S400 is preferably performed by the VCC, but can additionally or alternatively be any other suitable component, computed remotely, and or be otherwise determined. S400 is preferably performed after a (candidate) program is determined, but can additionally or alternatively be performed after a set of (candidate) programs are determined, but can additionally or alternatively be performed at any other suitable time.

The input to S400 is preferably a one or more predetermined (candidate) programs, but can additionally or alternatively include program information such as a proximity score (e.g., proximity of the working region's end state, after program application to the initial state, to the target state), program length, execution time, target image, the initial image, and/or any other suitable information. The proximity of the end state/intermediate state and the target state can be determined using element-wise (pixel-by-pixel) comparison, determining mutual information (determining the joint histogram of the initial-target pair), determining the scale-invariant feature transform (SIFT) features, by comparing the object parameter values (e.g., object distance, object pose, etc.) between the end state and the target state (target image) (e.g., by calculating a proximity score based on the object parameter differences or distances between the end state and the target state), and/or otherwise measuring the differences. The proximity score can be determined object by object, scene by scene, and/or otherwise determined. The proximity score can be a distance wherein the distance can be Euclidean, topographic, and/or otherwise determined. The proximity of the end state/intermediate state and the target state can be based on comparing a set of object positions in the end state/intermediate state with a set of object positions in the target state, and/or otherwise determining differences. The object positions can be simulated, manually generated, and/or otherwise determined.

In a first variation, evaluating the candidate program includes running the candidate program on the next initial-target pair within the test data set (e.g., applying S500 to the next initial-target pair), and selecting the candidate program(s) that transform the initial state, represented in the second initial image, into the target state, represented in the second target image (e.g., using the VCC to simulate the effects of the program on the initial state).

An example of selecting candidate program(s) that transform the initial state into the target state can include selecting a series of primitive functions and a set of argument values as the program in response to a set of final simulated object positions (e.g., the positions of a set of objects within the simulated end state) substantially matching the object positions in the target scene.

In a second variation, the program with the closest average or mean proximity to the target state (for each initial-target pair of the target data set) can be selected. However, the program can be manually selected, selected based on a set of rules, selected based on length (e.g., select the longest, select the shortest), selected based on a cost function (e.g., penalizing length and rewarding proximity the target state), selected based on cost (e.g., estimated difficulty of performance, estimated error rate, estimated energy or manipulator uptime cost), and/or selected based on any other suitable metric.

However, S400 can additionally or alternatively include any other suitable elements.

The method preferably includes executing the program on the system S500. S500 preferably functions to execute a program on the VCC based on an input (e.g., initial-target pair, initial image, etc.). S500 is preferably performed by the VCC, but can additionally or alternatively be performed by any other suitable system. S500 can be performed during candidate program evaluation (e.g., using the initial-target pair), during execution or runtime (e.g., using an image of a workspace sampled by a camera), and/or performed at any other suitable time.

The program is preferably executed based on input data, and can additionally or alternatively be executed using the instruction set, a program (e.g., selected program, candidate program), features determined from the input data in S200, argument values determined from the input data in S300, and/or any other suitable data. The input data can be: an initial image, execution data, and/or other data. Execution data is preferably a current image determined by sampling an input scene (e.g., using a visual sensor), but can additionally or alternatively be otherwise determined. S500 preferably includes: operating the VCC components according to their respective instructions within the program. However, S500 can be otherwise performed. In variants, S500 can optionally include translating the agent instructions into robot- or manipulator-specific instructions.

S500 can additionally or alternatively include mapping locations from VCC workspace (e.g., TW, real world, etc.) to a robot reference frame. Mapping locations can include: calibrating camera pose with respect to the robot; calibrating robot movement (e.g., arm rotation, arm extension, arm retraction, hand rotation, etc.); calibrating grabbing movement (e.g., hand grabbing an object), can include Level-1 calibration, Level-2 calibration, and/or Level-3 calibration; can include non-parametric robot calibration, parametric robot calibration; but can additionally or alternatively include any other suitable element. Parameters can include angle offsets, joint lengths, joint displacements, but can additionally or alternatively include any other suitable element. Mapping locations is preferably performed before program execution, but can additionally or alternatively be performed periodically during program execution, after program execution, and/or at any other suitable time.

However, S500 can additionally or alternatively include any other suitable elements.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for vision-based program induction, comprising:
   receiving at least one training set, the training set consisting essentially of an input scene and a target scene;
   detecting an object within the input scene and the target scene with a generative vision model;
   automatically selecting a series of primitive functions from a candidate set of primitive functions based on the input scene and the target scene, the series of primitive functions comprising:
   robotic primitive functions; and
   vision hierarchy primitive functions for the generative vision model;
   simulating a series of object positions within a simulated scene based on the series of primitive functions and a set of argument values, with a dynamics model and the generative vision model; and
   selecting the series of primitive functions and the set of argument values as the program in response to a final simulated object position substantially matching a target position of the object in the target scene, wherein the program is executed using a new input scene without a target inference scene.

2. The method of claim 1, wherein the series of primitive functions further include:
   attention control primitive functions for an attention software module configured to selectively attend to objects, identified within the input scene and the target scene by the generative vision model, using top-down attention gating; and
   fixation control primitive functions for a fixation software module configured to control a fixation point within the simulated scene.

3. The method of claim 1, further comprising executing the program on a robot, wherein the robot is associated with a concept specified by the training set, comprising:
   generating a robot-specific program by translating the robotic primitive functions within the program into robotic-specific functions;
   sampling the a new input scene; and
   controlling the robot according to the robot-specific program using the dynamics model and the generative vision model, based on the new input scene.

4. The method of claim 1, wherein the generative vision model includes:
   a recursively architected network of sub-networks organized into a plurality of hierarchical layers;
   the sub-networks comprising at least a parent feature node, a pool node, a parent-specific child feature (PSCF) node, and a child feature node;
   the parent feature node of at least one sub-network configured with a selection function actionable on at least two pool nodes connected to the parent feature node of the at least one sub-network;
   the pool node of the at least one sub-network configured with a selection function actionable on at least two PSCF nodes connected to the pool node of the at least one sub-network; and
   the PSCF node of the at least one sub-network configured to activate a connected child feature node.

5. The method of claim 1, wherein the candidate set of primitive functions and each of a candidate set of argument values associated with the primitive functions are related by a tree structure, wherein each edge is associated with a transition probability determined based at least in part on the input scene, wherein automatically selecting a series of primitive functions from a candidate set of primitive functions comprises: searching for the series of primitive functions and the set of argument values in decreasing order of probability.

6. The method of claim 5, wherein a set of primitive functions is combined into a subroutine, and wherein the subroutine is incorporated into the generative vision model as a node in the tree structure.

7. The method of claim 5, wherein the series of primitive functions further includes fixation control primitive functions for a fixation software module configured to control a fixation point within the simulated scene, the method further comprising receiving fixation guidance from a user, wherein the fixation guidance is used by the discriminative model to determine an argument for a fixation control primitive function within the series of primitive functions.

8. The method of claim 5, wherein the tree structure comprises a Markov chain.

9. The method of claim 5, wherein probabilities for the candidate set of argument values are determined by applying a neural network, by applying a conditional random field, or by querying the vision hierarchy.

10. The method of claim 5, further comprising:
generating a second program based on the input scene and the target scene;
updating the generative vision model based on the program and the second program to create an updated generative vision model; and
iteratively determining programs based on the input scene and the target scene, using the updated generative vision model.

11. The method of claim 10, wherein iteratively determining programs using the updated generative vision model comprises changing the transition probabilities.

12. The method of claim 1, further comprising automatically determining a set of argument values for the selected series of primitive functions.

13. The method of claim 1, the method further comprising:
determining a partial program comprising a second series of primitive functions and a second set of argument values;
executing the partial program, comprising:
generating a partial scene by executing the partial program;
determining a distance value between the partial scene and the target scene;
determining a heuristic value based on the distance value and a set of transition probabilities associated with the partial program;
associating the heuristic value with the partial program; and
wherein selecting the program comprises searching for the program based on the heuristic value.

14. The method of claim 1, further comprising detecting a plurality of objects within the input scene and the target scene, the plurality of objects comprising the object;
wherein a different series of object positions is simulated for each of the plurality of objects; and
wherein the program is selected in response to a final simulated object position for each of the plurality of objects substantially matching a respective target position for each object within the target scene.

15. A system for robotic program execution, comprising at least one processor configured to execute:
a vision hierarchy that detects objects within an input scene and extracts a set of attributes for each object from an input scene, the vision hierarchy responsive to a set of vision hierarchy primitive functions;
a fixation controller that positions a reference point of a field of interest within the input scene, the fixation controller responsive to a set of fixation control primitive functions;
an attention controller that selects an attended set of objects within the field of interest from the detected objects, the attention controller responsive to a set of attention control primitive functions;
a robot controller that controls a manipulator to manipulate the selected attended set of objects within the input scene, the robot controller responsive to a set of robot control primitive functions; and
a program comprising a series of primitive functions that are selected based on moving an object in an input scene to a final simulated object position that substantially matches a target position of the object in a target scene, the program comprising: vision hierarchy primitive functions from the set of vision hierarchy primitive functions; fixation control primitive functions from the set of fixation control primitive functions; attention control primitive functions from the set of attention control primitive functions; and robot control primitive functions from the set of robot control primitive functions, wherein the program is executed using a new input scene without a target inference scene.

16. The system of claim 15, wherein the vision hierarchy includes a generative vision model that extracts a hierarchy of schematic representations for each object within the input scene.

17. The system of claim 16, wherein the attention controller selectively attends to an object, within the field of interest, based on the respective hierarchy of schematic representations, using top-down attention gating.

18. The system of claim 16, wherein the generative vision model includes:
a recursively architected network of sub-networks organized into a plurality of hierarchical layers;
the parent feature node of at least one sub-network configured with a selection function actionable on at least two pool nodes connected to the parent feature node of the at least one sub-network;
the pool node of the at least one sub-network configured with a selection function actionable on at least two PSCF nodes connected to the pool node of the at least one sub-network; and
the PSCF node of the at least one sub-network configured to activate a connected child feature node.

19. The system of claim 15, wherein the processor is further configured to execute a dynamics model that collectively simulates an upcoming action with the vision hierarchy in virtual space, based on upcoming robot control primitive functions within the program.

20. The system of claim 15, wherein the processor is further configured to execute an object indexer that indexes each object, within the attended set of objects, based on proximity of the respective object to the reference point.

21. The system of claim 15, wherein the program is generated using:
a training set, consisting essentially of an input scene and a target scene;
a candidate set of primitive functions, comprising: the set of vision hierarchy primitive functions, the set of fixation control primitive functions, the set of attention control primitive functions, and the set of robot control primitive functions;
a generative model that probabilistically determines a series of primitive functions from the candidate set of primitive functions; and
a discriminative model that probabilistically determines arguments for primitive functions within the series of primitive functions.

22. The system of claim 21, wherein the discriminative model comprises a neural network.

* * * * *